JOHN B. REID
ROBERT A. SPENCE
INVENTORS
BY
ATTORNEYS

Oct. 22, 1963   J. B. REID ETAL   3,107,376
APPARATUS FOR ASSEMBLING AN INSOLE AND LAST IN ALIGNED RELATION
Filed March 18, 1963   25 Sheets-Sheet 2

JOHN B. REID
ROBERT A. SPENCE
INVENTORS
ATTORNEYS

JOHN B. REID
ROBERT A. SPENCE
INVENTORS

Oct. 22, 1963 J. B. REID ETAL 3,107,376
APPARATUS FOR ASSEMBLING AN INSOLE AND LAST IN ALIGNED RELATION
Filed March 18, 1963 25 Sheets-Sheet 4

JOHN B. REID
ROBERT A. SPENCE
INVENTORS

ATTORNEYS

JOHN B. REID
ROBERT A. SPENCE
INVENTORS

BY
ATTORNEYS

JOHN B. REID
ROBERT A. SPENCE
INVENTORS

Oct. 22, 1963  J. B. REID ETAL  3,107,376
APPARATUS FOR ASSEMBLING AN INSOLE AND LAST IN ALIGNED RELATION
Filed March 18, 1963  25 Sheets-Sheet 10

JOHN B. REID
ROBERT A. SPENCE
INVENTORS

BY
ATTORNEYS

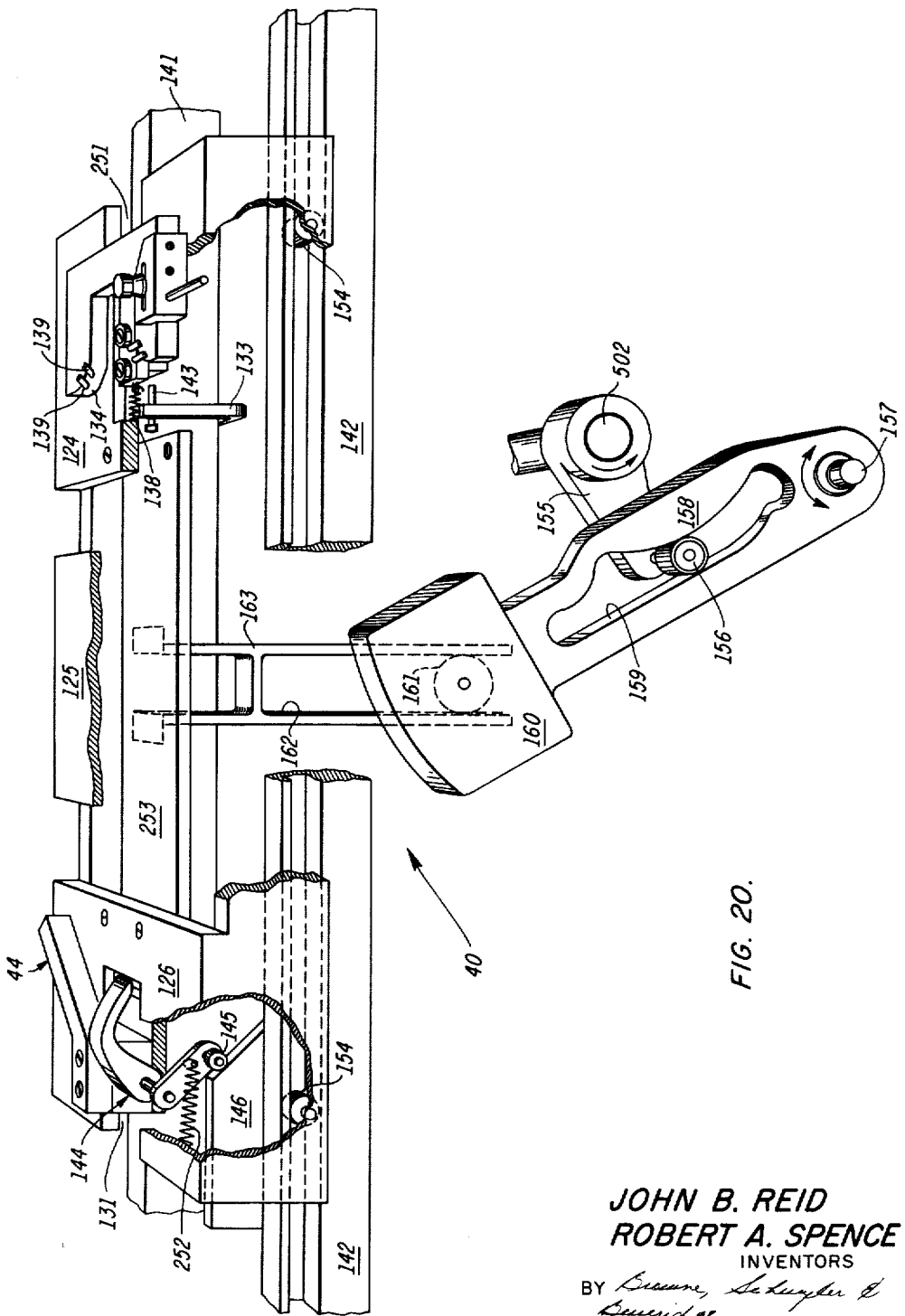

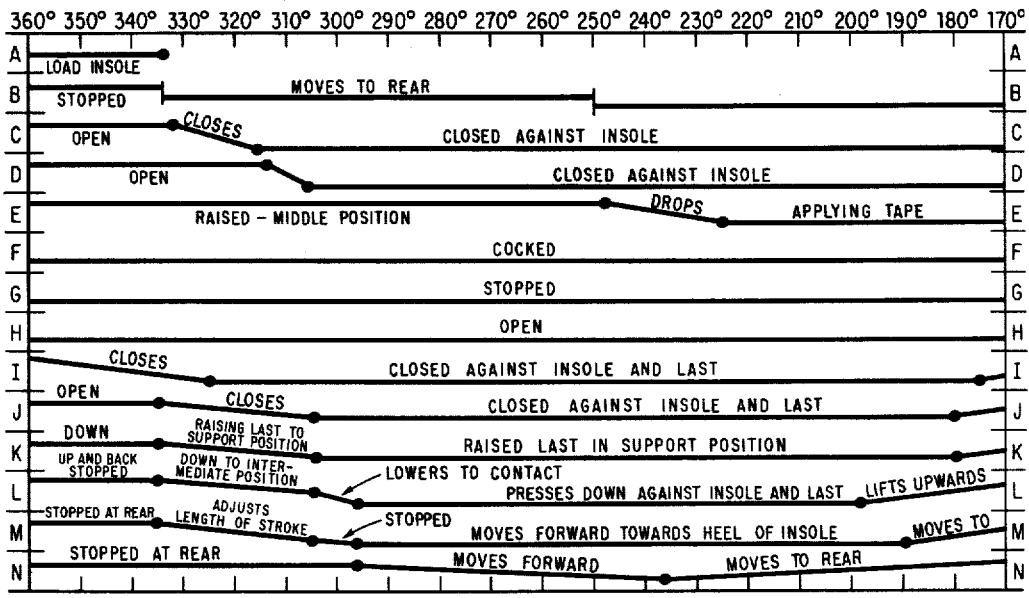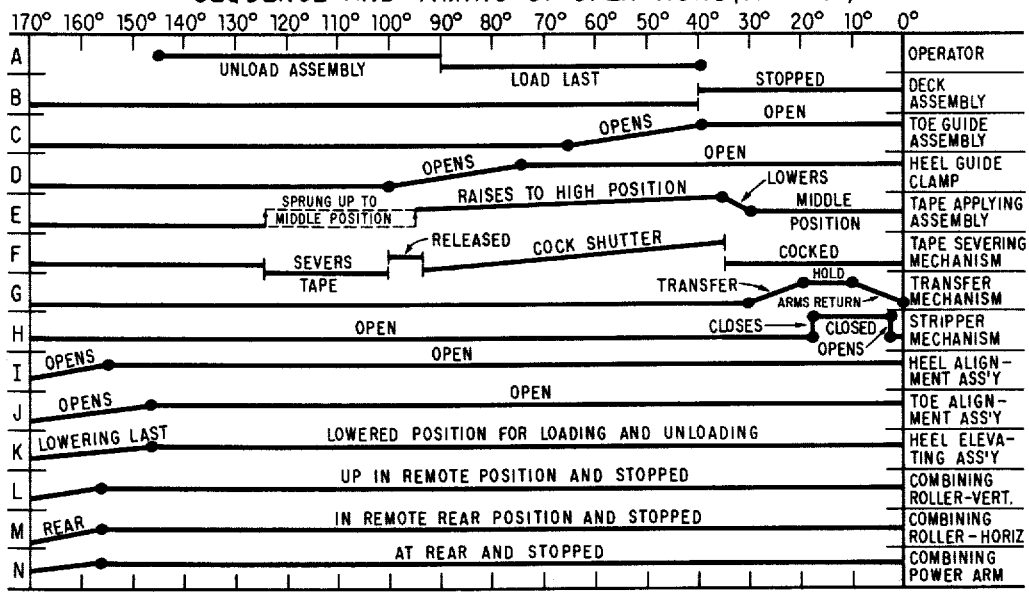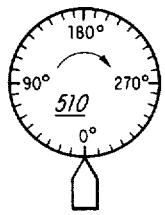

Oct. 22, 1963  J. B. REID ETAL  3,107,376
APPARATUS FOR ASSEMBLING AN INSOLE AND LAST IN ALIGNED RELATION
Filed March 18, 1963  25 Sheets-Sheet 17

JOHN B. REID
ROBERT A. SPENCE
INVENTORS

BY
ATTORNEYS

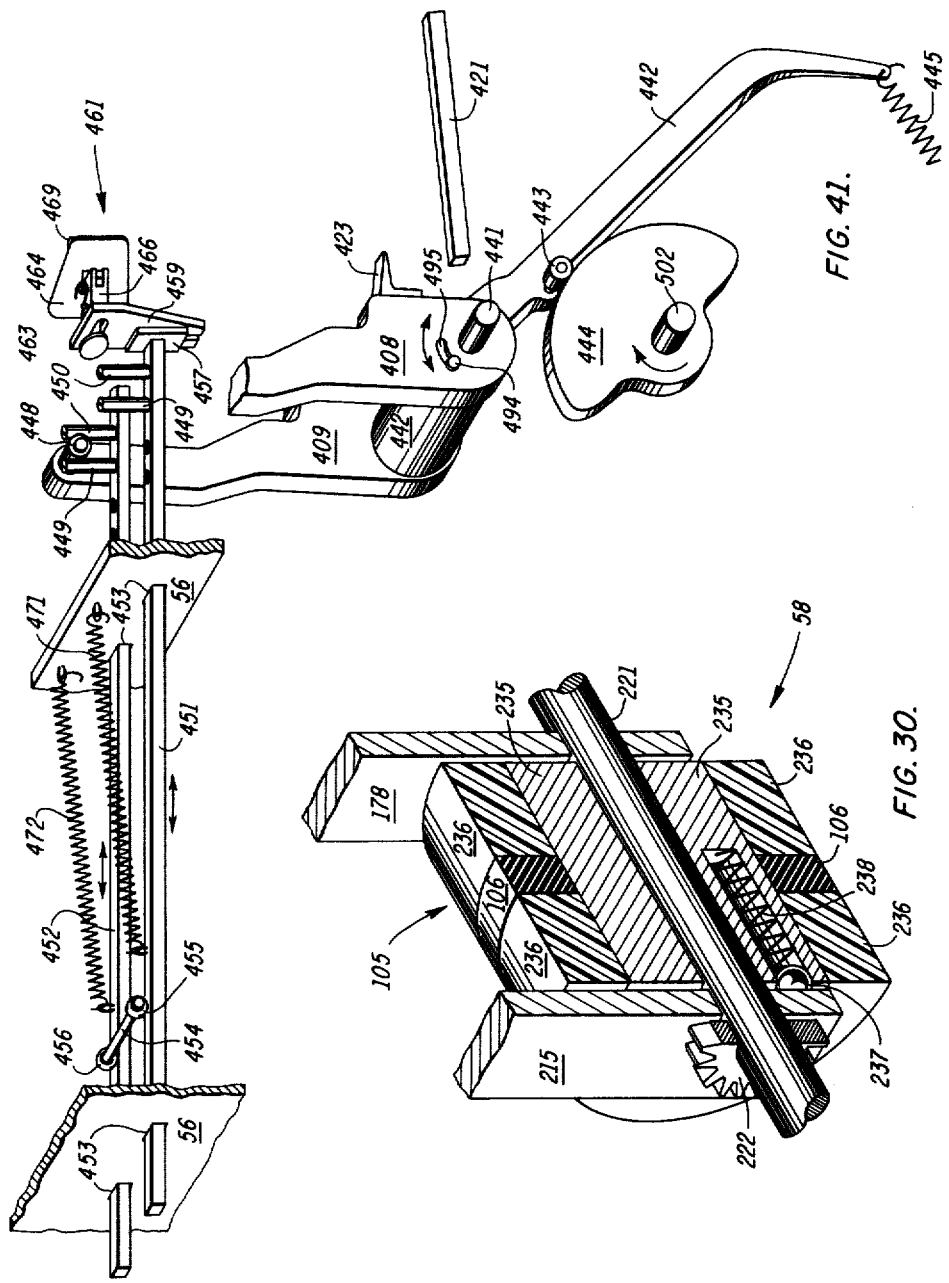

JOHN B. REID
ROBERT A. SPENCE
INVENTORS

ATTORNEYS

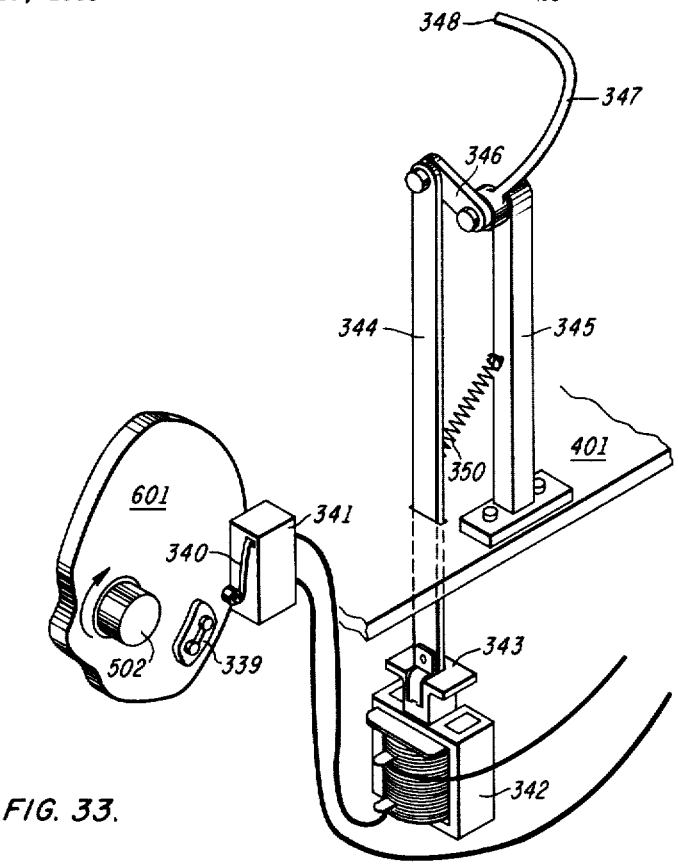
FIG. 33.
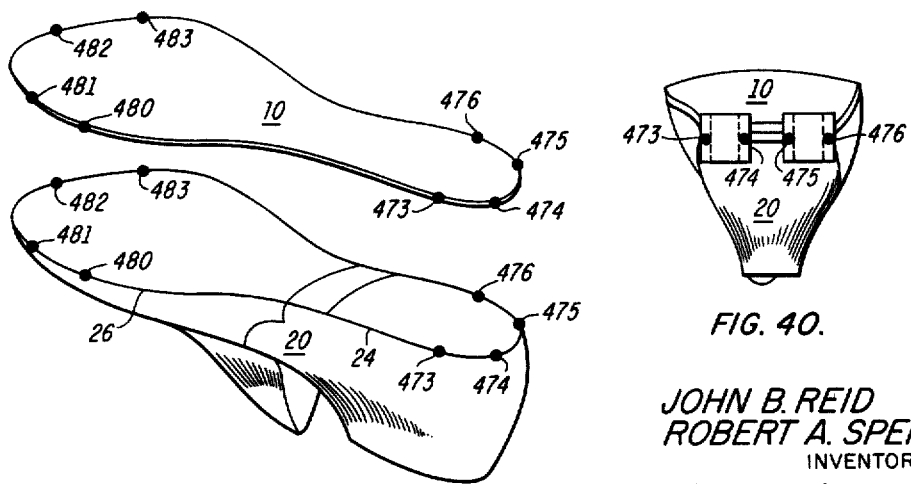
FIG. 39.
FIG. 40.
JOHN B. REID
ROBERT A. SPENCE
INVENTORS
BY Browne, Schuyler &
Burridge
ATTORNEYS

JOHN B. REID
ROBERT A. SPENCE
INVENTORS

BY
ATTORNEYS

Oct. 22, 1963  J. B. REID ETAL  3,107,376
APPARATUS FOR ASSEMBLING AN INSOLE AND LAST IN ALIGNED RELATION
Filed March 18, 1963  25 Sheets-Sheet 23

JOHN B. REID
ROBERT A. SPENCE
INVENTORS

BY *[signature]*

ATTORNEYS

JOHN B. REID
ROBERT A. SPENCE
INVENTORS

Oct. 22, 1963  J. B. REID ETAL  3,107,376
APPARATUS FOR ASSEMBLING AN INSOLE AND LAST IN ALIGNED RELATION
Filed March 18, 1963  25 Sheets-Sheet 25

JOHN B. REID
ROBERT A. SPENCE
INVENTORS

BY Browne, Schuyler &
Beveridge ATTORNEYS

United States Patent Office 3,107,376
Patented Oct. 22, 1963

3,107,376
APPARATUS FOR ASSEMBLING AN INSOLE AND
LAST IN ALIGNED RELATION
John B. Reid, Brighton, and Robert A. Spence, South
Lincoln, Mass., assignors to Bain Corporation, Cambridge, Mass., a corporation of Massachusetts
Filed Mar. 18, 1963, Ser. No. 265,611
46 Claims. (Cl. 12—1)

This invention generally relates to the manufacture of footwear, and more particularly to a novel apparatus for automatically combining an insole and last in aligned relation to form a detachably assembled unit, as a separate step in the manufacturing procedure. This application is a continuation-in-part of our copending United States applications, Serial Number 174,839, now Patent No. 3,092,861, granted June 11, 1963, and Serial Number 174,841, now Patent No. 3,099,026, granted July 30, 1963, concurrently filed on February 21, 1962.

In the past, insoles have customarily been secured to the bottom of a last by means of suitable tack fasteners driven directly through the insole into the last in order to temporarily secure the same in assembled relation after being manually aligned. The disadvantages of such a procedure are readily apparent. Each tack must be individually applied and subsequently removed, either manually or by a mechanical puller, with the resultant destructive marring or gouging of the insole. Occasional shearing of the conventional tack head necessitated separate inspection of each shoe for the purpose of detecting and removing the embedded point. The exposed foot contacting surface of the insole would often be stanied or damaged by seepage of the chemical binders of the bottom filler through the individual tack holes. Moreover, continuous insertion and removal of tacks results in continuous mutilation and materially contributes to eventual destruction of the last. The desirability of replacing the customary tack fastener with some other means to temporarily secure an insole to the insole supporting bottom portion of a related last has long been recognized by the industry. For example, an insole can be directly bonded to the last bottom by a thermoplastic adhesive material which may be subsequently released through the application of either heat or by vibrational shock.

Regardless of the means employed, the detachably assembled insole and last must be firmly retained in aligned relation so as to withstand the severe lateral and normal stresses that are imposed during the lasting operation which tend to displace the insole relative to the last. The combining procedure formerly employed required precise manual alignment of a contoured insole with the bottom of a related last, which heretofore could only be achieved by a skilled operator capable of manually manipulating and positioning the components in aligned relation until firmly secured by the customary tack fasteners. Even then, misalignment was possible if the insole became displaced during the combining operation before the components had been firmly secured. Since this operation is an initial step in the assembly and fabrication of footwear, any inaccuracy in alignment of an insole relative to its related last will directly affect the quality of the resultant product.

Accordingly, this application is a further improvement pertaining to the subject matter disclosed in our Patent Number 3,052,904, issued September 11, 1962, which generally relates to a novel method for detachably securing an insole to a last with double faced, pressure-sensitive adhesive material, preferably in the form of tape, which serves to prevent displacement of the assembled components during the lasting operation, in the manner more fully described in said patent.

This application is also a further improvement over our aforementioned copending application, Serial Number 174,841, now Patent No. 3,099,026, granted July 30, 1963, which generally relates to a novel method of applying adhesive material to an insole.

This application is additionally a further improvement over our aforementioned copending application, Serial Number 174,839, now Patent No. 3,092,861, granted June 11, 1963, which generally relates to a novel method of automatically aligning and combining a contoured insole with a related last. The disclosures of each of the aforementioned applications and patents are incorporated herein as a part hereof by reference.

An important object of the present invention relates to an improved apparatus and means for automatically applying adhesive material, preferably in tape form, to an insole regardless of its contoured outline which includes, means for positioning the insole to receive the tape within an area defined by the common outline formed from superimposing upon the last contacting face of the insole an opposed image thereof, means for selectively controlling the length and relative position of the tape being applied within the defined area, means for stripping an interliner from a roll of tape in direct relation to the amount of tape being removed from the roll as well as means for effecting the transfer of tape.

A further important object of the invention relates to an improved apparatus and means for automatically aligning a contoured insole with a related last having an insole supporting bottom portion generally corresponding in contoured outline with at least a portion of the contoured insole which includes, means for displacing any related overlapping peripheral portion to a position of final alignment where the corresponding contoured outlines of the insole and bottom portion of the last coincide in superposed aligned relation, which means also serves to retain the aligned insole and last in aligned relation until combined into a detachably assembled unit.

A still further important object of the present invention relates to an apparatus for automatically combining an insole and last in aligned relation to form a detachably assembled unit which includes, means for applying adhesive material, preferably in the form of double-faced, pressure-sensitive tape, to a contoured insole, means for transferring the taped insole for subsequent alignment with the bottom portion of a related last, means for aligning the taped insole with the last as well as means for combining the aligned insole and last into a detachably assembled unit while being retained in aligned relation.

Another object of this invention relates to an improved tape applying aligning and combining apparatus of the above character which is thoroughly reliable, effective and completely automatic in operation, relatively simple in construction, adaptable to meet varied conditions encountered in the manufacture of footwear, and capable of performing the objects for which the same is intended.

Other objects and the entire scope of the present invention will become apparent from the following detailed description and by reference to the accompanying drawings. It should be understood, however, that the detailed description and specific examples, while indicating preferred embodiments of the invention, are given by way of illustration only, since various changes and modification within the spirit and scope of the invention will become apparent as the description herein progresses. Reference now being made to the accompanying drawings which form a part hereof, wherein like numerals refer to similar parts throughout, and in which:

FIGURE 20 is a schematic isometric view, with parts removed, illustrating the deck assembly and related actuating components;

FIGURE 22 is a schematic illustration indicating the relative position and direction in which the main shaft index rotates;

FIGURE 29 is a schematic illustration of the apparatus operating cycle, the lower view of which is a continuation of the upper view;

FIGURE 30 is an enlarged cross-sectional isometric schematic view of a tape applying roll employed in the present invention;

FIGURE 33 is a partial schematic perspective view, with parts removed, of an insole stripper assembly and its related actuating components;

FIGURE 39 is an exploded perspective view of a contoured insole and related last illustrating the corresponding peripheral points of coincidence;

FIGURE 40 is a perspective end view of an insole and related last shown in aligned relation;

FIGURE 41 is a partial isometric side view, with parts removed, showing the toe alignment assembly and related actuating components;

SUMMARY OF OPERATION

Tape Applying Sequence

Figure 3:
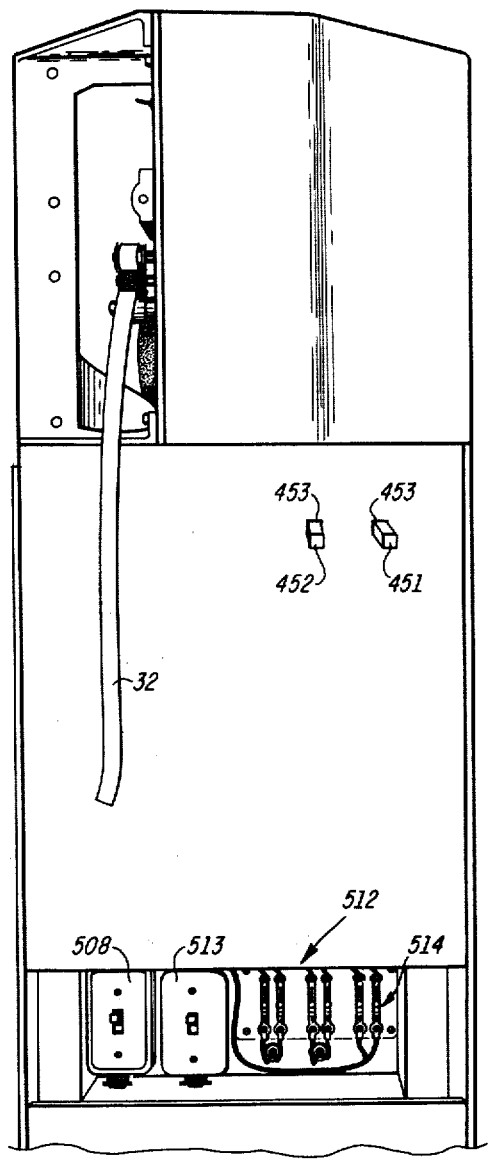
FIGURE 3 is a partial perspective view of the back of the apparatus illustrated in FIGURE 1.
Figure 4:
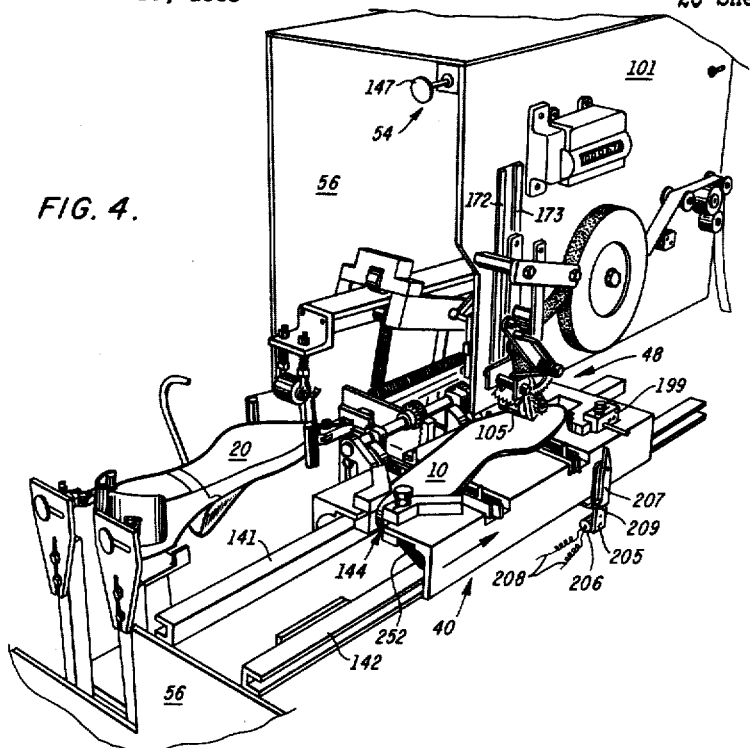
FIGURE 4 is a partial perspective view of a tape applying station constructed in accordance with the present invention showing the deck assembly moving longitudinally toward the rear of the apparatus and the toe and heel guide assemblies positioning a contoured insole.
Figure 5:
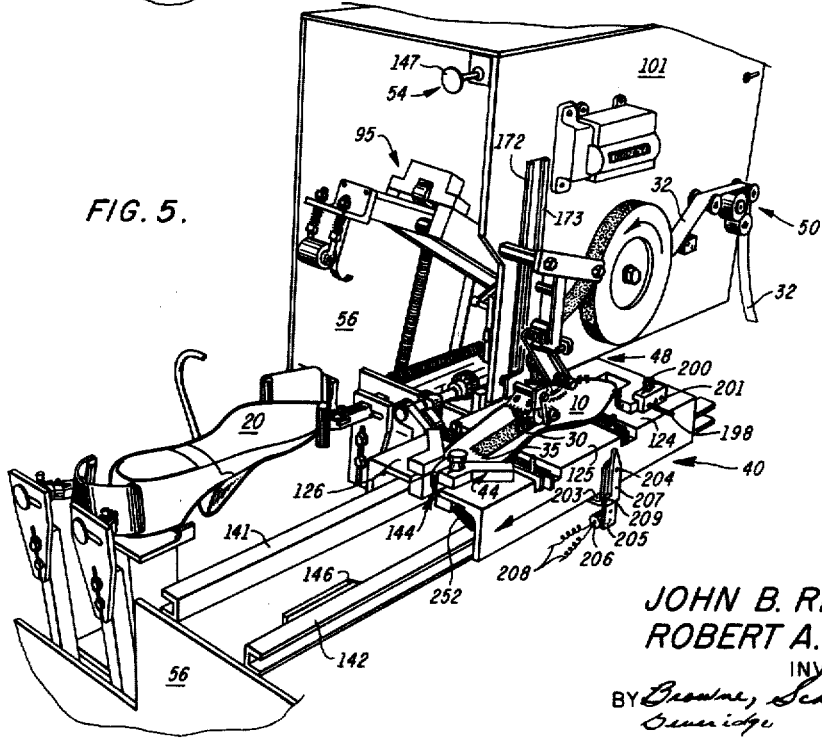
FIGURE 5 is a partial perspective view of the tape applying station showing the application of tape to the positioned insole during the return movement of the deck assembly.
Figure 6:
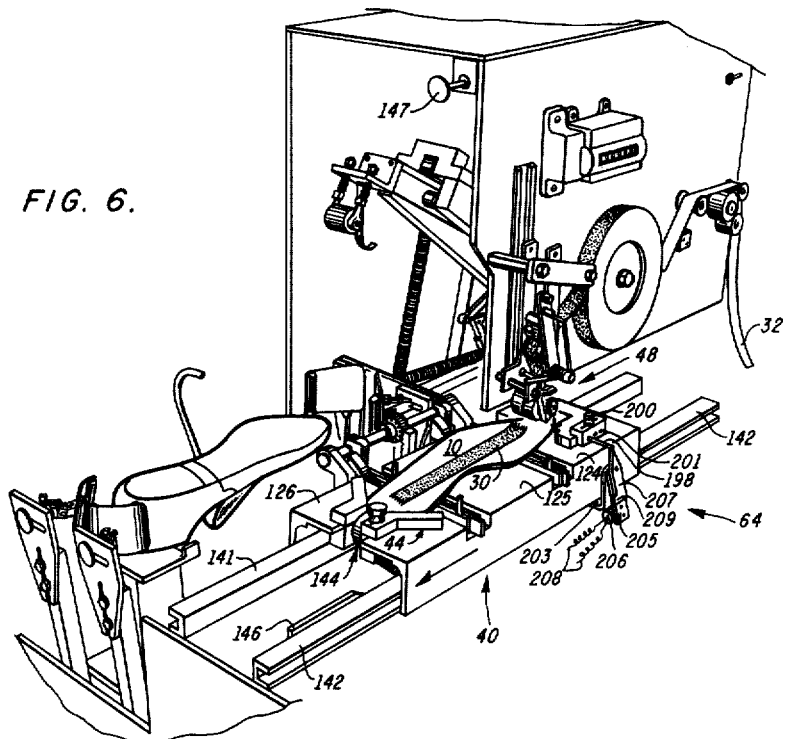
FIGURE 6 is a partial perspective view of the tape applying station showing the position of the movable deck assembly upon severance of the tape.
Figure 7:
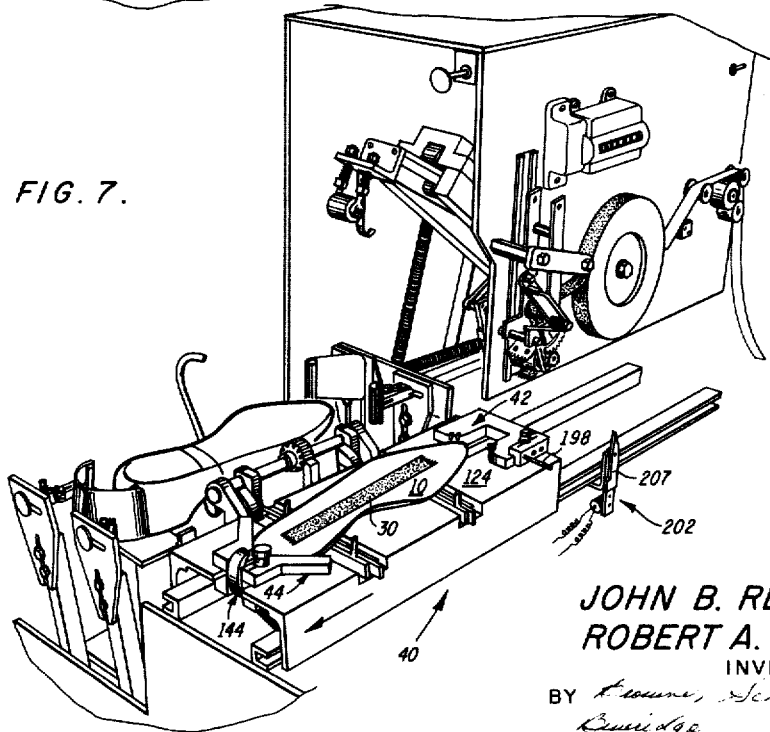
FIGURE 7 is a partial perspective view of the tape applying station showing the deck assembly positioned at the front of the apparatus with the toe and heel guide assemblies in open retracted position to release the taped insole.

Referring now more specifically to the apparatus illustrated in FIGURES 1 to 16; a contoured insole 10 and related last 20 are initially presented to the tape applying and associated aligning and combining sections of the machine. The insole 10 is presented to the tape applying station 100 and loaded onto a movable deck assembly 40, between toe and heel guide assemblies 42 and 44, respectively. As the deck assembly moves longitudinally toward the rear of the apparatus, as shown in FIGURE 4, the insole 10 is retained in position to receive tape by the toe and heel guide assemblies. After traveling to the rear of the machine, the deck assembly, carrying the positioned insole, then returns, as illustrated in FIGURE 5, passing beneath the lowered tape applying assembly 48 which has been previously actuated by a trigger mechanism 54 to effect the transfer of tape to the last contacting face 11 of the insole. While the tape 30 is being applied, the tape interliner 32 is automatically stripped from the roll of tape 34 by the liner take-up assembly 50. After a predetermined length of tape has been applied to the insole, the tape severing mechanism 64 is actuated by a switch 202 to cut the tape as the tape applying assembly moves upwardly away from the insole, in the manner illustrated in FIGURE 6. As the deck assembly proceeds to a forwardmost position, the toe and heel guide assemblies release the taped insole, as indicated in FIGURE 7.

Transferring Sequence

Figure 8:
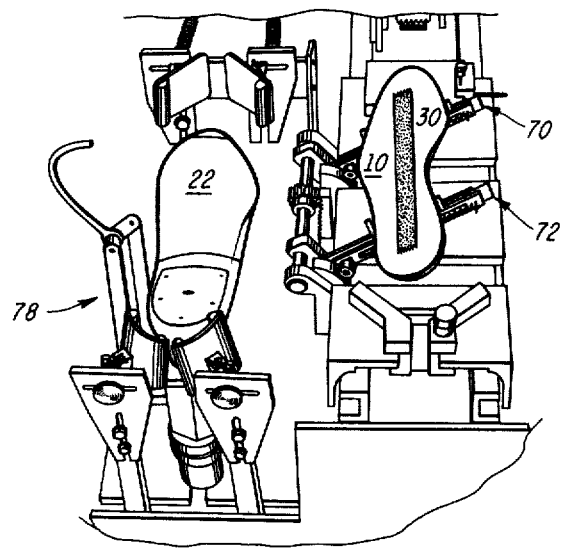
FIGURE 8 is a partial perspective of a transfer station constructed in accordance with the present invention showing the taped insole being transferred from the applying section to an associated aligning and combining section of the apparatus by the transfer arm assemblies.
Figure 9:
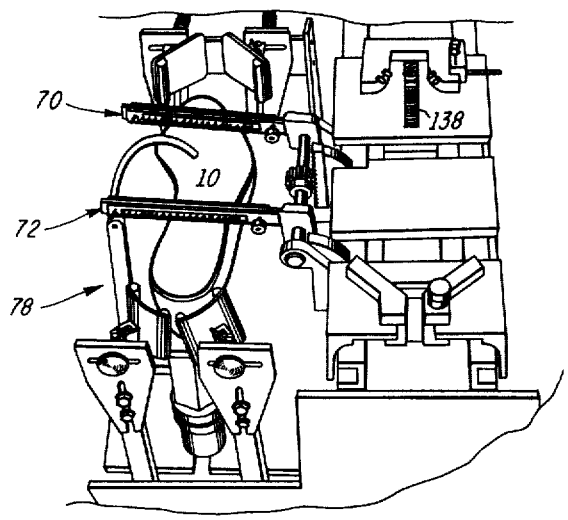
FIGURE 9 is a partial perspective view of the transfer station showing the apparatus after the insole has been transferred to the aligning station and stripped from the transfer arms assemblies onto the bottom portion of a related last.

With reference to FIGURES 8 and 9, after the deck assembly has come to rest, the taped insole is grasped by the toe and heel transfer arms 70 and 72, respectively, which rotate between the juxtaposed tape applying and aligning stations from a retracted insole receiving position within the movable deck assembly to a releasing position above the previously mounted last 20 whereupon the stripper assembly 78 is actuated, freeing the insole from the transfer arms and depositing it on the related bottom portion 22 of the last. Thereafter, the transfer arms return to retracted position within the deck assembly.

Aligning Sequence

Figure 10:
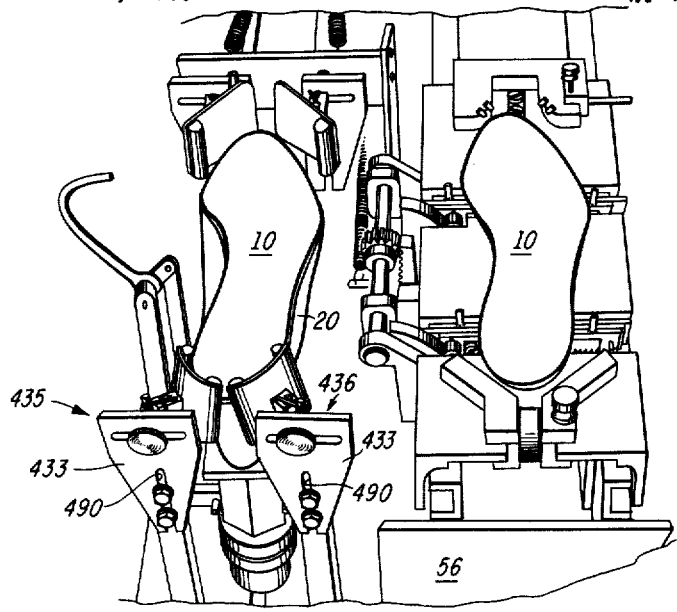
FIGURE 10 is a partial perspective view of an aligning station constructed in accordance with the present invention showing the heel alignment assembly closed against the superimposed insole and last as well as a new insole loaded onto the deck assembly of the tape applying section.
Figure 11:
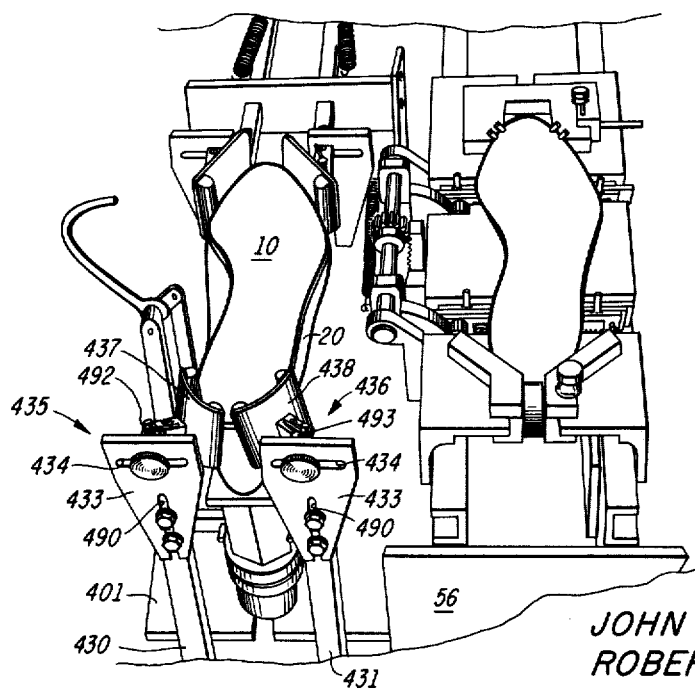
FIGURE 11 is a partial perspective view of the aligning station showing the toe and heel alignment assemblies closed against the positioned insole and last to retain the same in aligned relation.
Figures 12, 13:
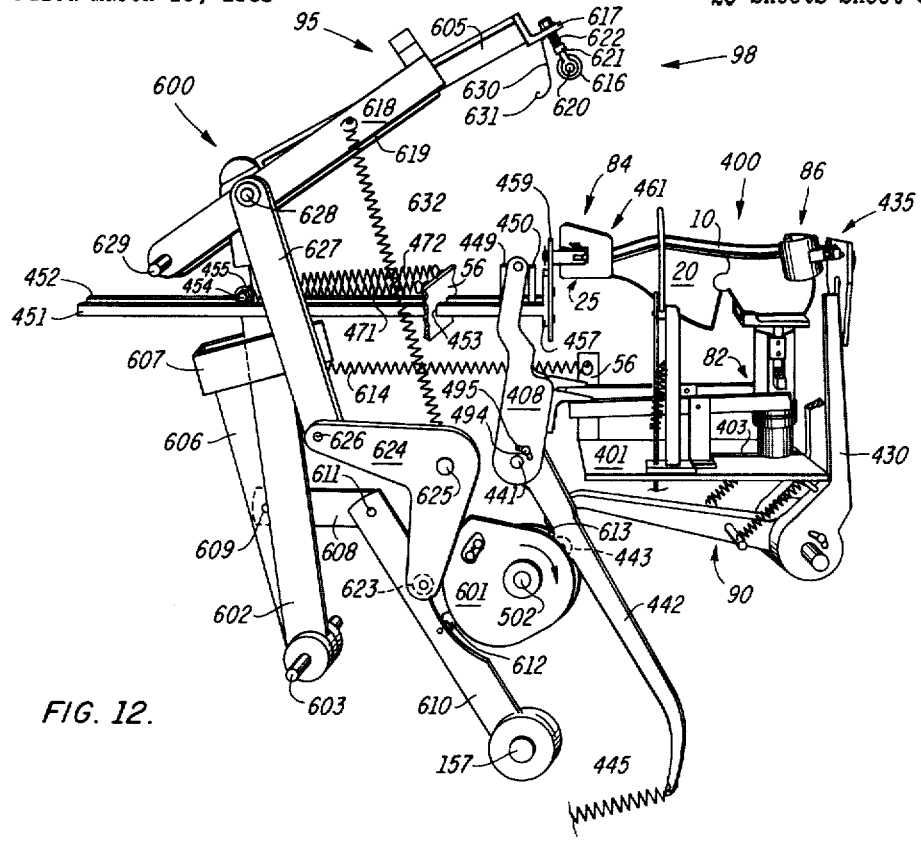
FIGURE 12 is a partial perspective side view, with parts removed, of the associated alignment and combining section of the apparatus constructed in accordance with the present invention showing the heel rest and last elevating assemblies as well as the related actuating components of the aligning and combining stations preparatory to the combining operation.
FIGURE 13 is a partial perspective view similar to FIGURE 12, with parts removed, showing the position of the actuating components at the beginning of the combining operation.

Referring now to FIGURES 10 through 12, the taped insole is now aligned with the related last in the aligning station 400 of the machine. The toe alignment assembly 84 moves longitudinally forward towards the toe portion 25 of the last while the heel alignment assembly 86 closes against the heel portions 13 and 23 of the insole and last, respectively. As the toe alignment assembly 84 moves toward the toe of the last 20, it actuates the last elevating assembly 90, raising the last to a position where the insole contacting bottom portion 22 of the last will be disposed at approximately the same relative height with respect to the guide tip asemblies 92 and 94 of the toe and heel alignment assemblies 84 and 86, respectively, regardless of the last size. The toe and heel alignment assemblies then close against the assembled insole and last displacing any related overlapping peripheral portion to a position of final alignment where the corresponding contoured outlines of the insole and bottom portion of the last coincide in superposed aligned relation. The toe and heel alignment assemblies also serve to retain the aligned insole and last in aligned relation until combined into a detachably assembled unit.

Combining Sequence

After the insole has been fully aligned with a related last, the assembled components are then combined into a unitary structure in the combining station 600 of the machine. This is accomplished by the double-faced, pressure-sensitive tape 30 previously applied to the last contacting face of the insole which serves to adhesively secure the assembled components together.

Upon completion of the aligning sequence, a combining arm assembly 96 descends downwardly causing the combining roller assembly 98 to press the taped insole against the bottom portion of the related last while the components are retained in aligned relationship. A combining finger 630 assists the combining roller assembly 98 in pressing the toe 14 of the insole against the last toe 25. The combining roller assembly 98 then moves toward the heel 13 of the insole applying pressure to bond the taped insole of the last bottom. After the combining roller assembly 98 reaches a position adjacent the heel alignment assembly 94, it is lifted upwardly and retracted by the combining arm assembly 96 to a remote raised position. The toe and heel alignment assemblies 84 and 86 then open, releasing the detachably assembled insole and last structure for subsequent removal by the operator. Thereafter the sequence of operation is repeated with another contoured insole and related last.

TAPE LOADING

Figure 1:
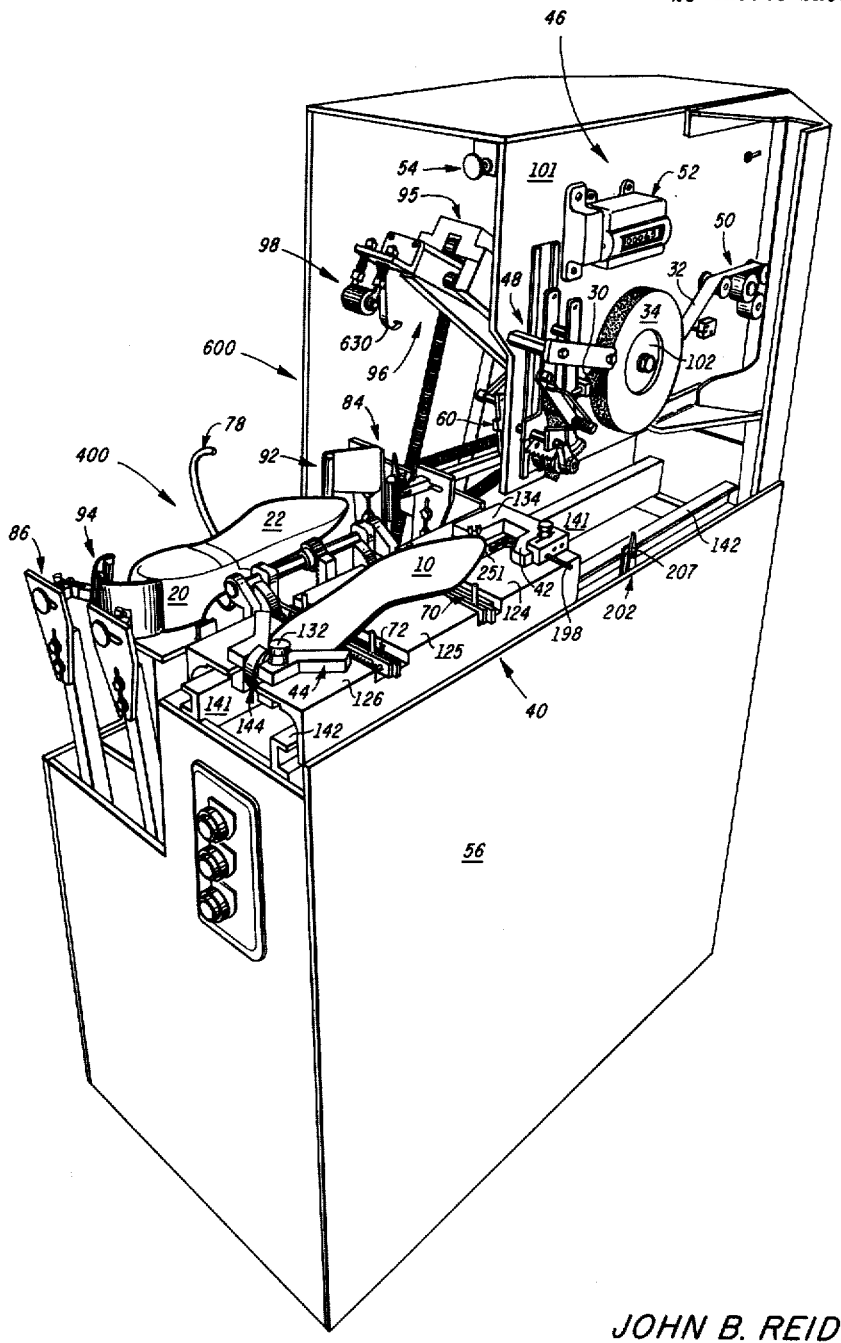
FIGURE 1 is a perspective view of the front right side of an apparatus for automatically combining an insole and last in aligned relation which forms the subject matter of the present invention.
Figure 17:
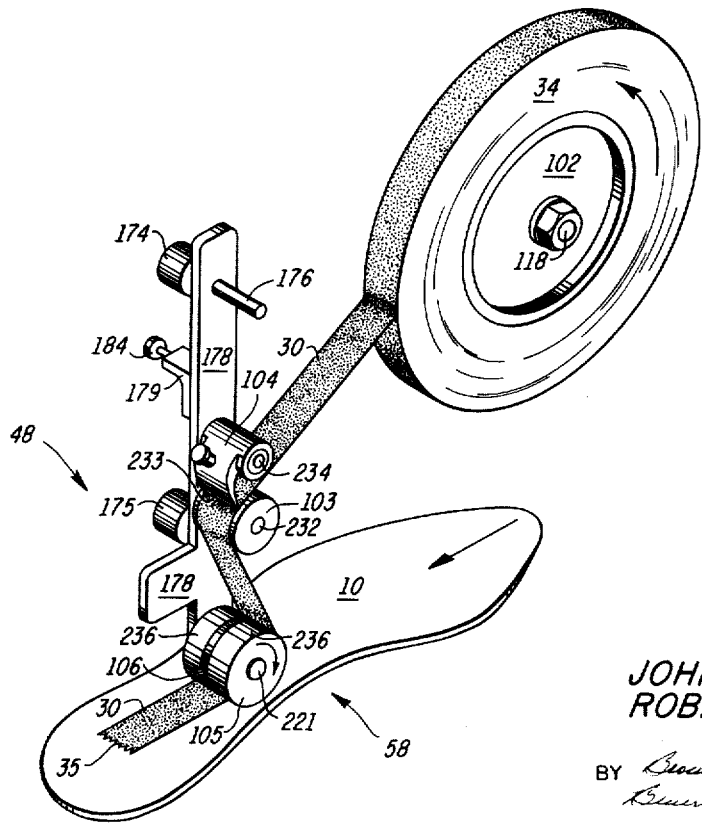
FIGURE 17 is an isometric schematic view, with parts removed, of the tape applying assembly illustrating the path of tape movement while being transferred to an insole.

Referring now to FIGURES 1 and 17, a tape roll 34 is loaded by the operator on a tape roll wheel 102 rotatably mounted on the outer face of taping plate 101. Double faced, pressure-sensitive tape is employed, preferably of the type disclosed in our Patent No. 3,052,904, granted September 11, 1962.

A portion of the parting medium or interliner 32, separating the adjacent adhesive surfaces of tape roll 102, is stripped off and the exposed terminal end 35 of tape threaded counterclockwise over a tape lock roll 103 and beneath a tape lock pawl 104 of the tape applying assembly 48. The tape is then threaded clockwise around the periphery of the applying roller 105 and pressed lightly into adhesive contact with central roller disk 106 with the terminal portion 35 extending beneath the bottom of the applying roller.

LINER TAKE-UP

Figure 18:
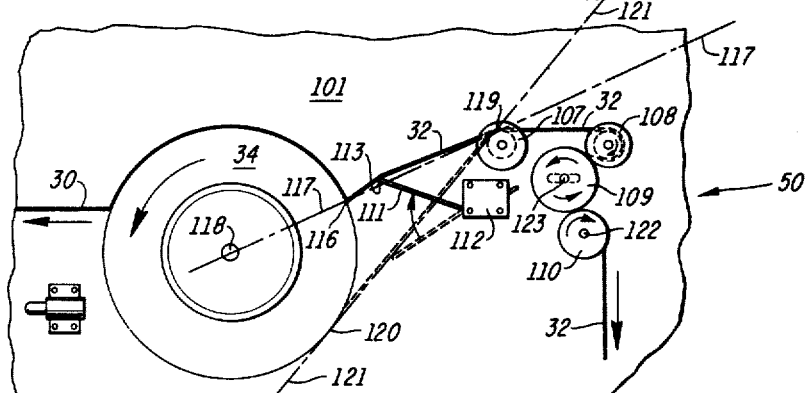
FIGURE 18 is schematic side elevation view of a liner take-up assembly illustrating the sensing range through which an interliner passes while being stripped from a roll of tape.

That portion of the interliner 32 which has been stripped from the tape roll 34 is then fed to the liner take-up assembly 50 shown in FIGURE 18 mounted on the outer face of plate 101 where it is led upwardly over liner take-up spool or guide 107, as shown in FIGURES 1 and 18, and threaded clockwise around spool 108, counterclockwise around liner take-up jam roll 109 and then clockwise around liner take-up power roll 110. A liner take-up switch arm 111, extending from the adjustably mounted microswitch 112, is positioned to bear against the liner 32 with its leading edge 113. The electrical motor actuating switch 114, for controlling power to the liner take-up power roll motor 115, is then switched to the "on" position. This completes the tape loading phase.

The uppermost point of separation 116 of liner 32 from the outer periphery of roll 34 as the liner moves upwardly, must not be above a line 117—117 extending between the central axis 118 of roll 34 and the point 119 at which the liner 32 meets the upper periphery of spool 107, otherwise stripping of the liner will cause roll 34 to move in a reverse clockwise direction.

The lowermost point 120 of separation between the liner 32 and the outer periphery of roll 34 must not be below a line 121—121 extending tangentially between the lower outer periphery of roll 32 and point 119. A responsive range of sensitivity lies between the uppermost and lowermost points 116 and 120, respectively, wherein the liner microswitch arm 111 is positioned to operate between "on" and "off" positions on demand.

During actual operation, while tape is being removed from the tape roll 34, microswitch 112 will switch to the "on" position as the liner 32 rises upwardly during its travel between the tape roll and the forward liner spool or guide 107. As the position of the liner changes angularly due to the counterclockwise rotation of the tape roll 34 between the lowermost and uppermost points of separation, the liner microswitch arm 111, which is spring biased upwardly and bears directly against a face of the liner, will actuate the microswitch between "off" and "on" positions. Thus the included angle between lines 117—117 and 121—121, which bisect at point 119, defines the operative limits for detecting movement of the liner relative to the angular displacement of the tape roll.

The microswitch is electrically connected to the liner take-up power roll motor 115 which drives shaft 122 carrying power roll 110. Motor 115 is mounted on the opposite inner side of taping plate 101 from the roll 110 and preferably is a 1/15 H.P., 1725 r.p.m electric motor. The power roll 110 is usually made of soft rubber. The liner take-up jam roll 109, also made of rubber, is rotatably mounted on jam roll arm 123 which in turn is slideably disposed on the taping plate 101 within a suitable guideway. Sliding movement of the jam roll 109 causes the liner 32 to be pinched between the power roll 110, jam roll 109 and the liner take-up spool 108 when power is supplied by the motor 115 to roll 110 through drive shaft 122. Pinching the liner causes the power roll 110 to apply tension to liner 32 and strip it from the tape roll 34. When the liner is being stripped from the tape roll by means of the power roll, it angularly changes position while traveling between the tape roll 34 and spool 107, whereupon applied tension to the liner will cause it to progressively bear downwardly against the leading edge 113 of switch arm 111, thereby shutting off microswitch 112 and interrupting electrical power to motor 115 which, in turn, removes tension and relieves the associated pinching action of liner 32 by jam roll 109. Removal of power from roll 110 relaxes the tension applied to liner 32 between rolls 109 and 110 whereupon power roll 110 will merely coast to a stop without imparting any further tension to the liner and thereby avoid over-stripping since the liner is not pulling roll 109 into a pinched jamming position. The liner, after having passed between jam roll 109 and the power roll 110, is permitted to drop freely, as illustrated in FIGURES 3 and 18, into any convenient receptacle (not shown). It should be understood that operation of the liner take-up assembly 50 is not affected by the decreasing diameter of tape roll 34.

GENERAL METHOD OF POSITIONING INSOLES

Figure 21:
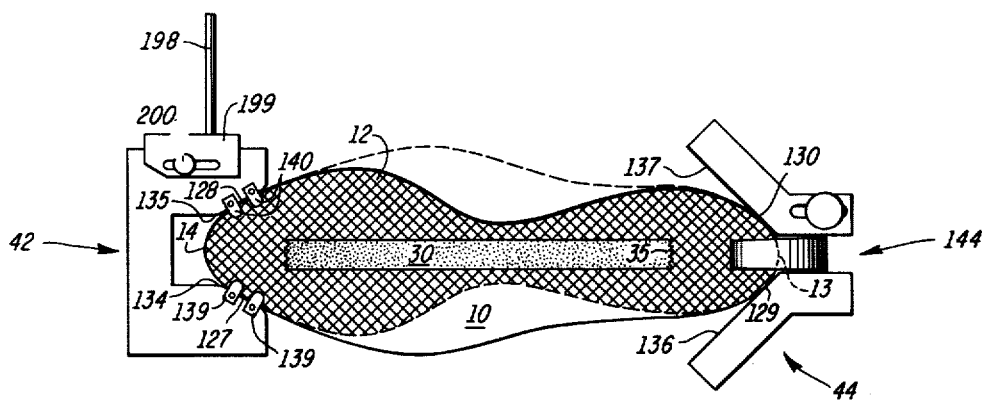
FIGURE 21 is a schematic plan view of a left insole with an opposed image thereof superimposed thereon to define a common area outlined in phantom and positioned between the toe and heel guide assemblies to receive a length of tape.

As shown in FIGURES 1, 20, and 21 either a right or left insole 10 is loaded by the operator on the horizontal section plates 124, 125 and 126, which constitute the work supporting surface of deck assembly 40, between the fixed but adjustable heel guide assembly 44 and the movable toe guide assembly 42. The angular positioning members of the toe and heel guide assemblies, with their included angles, serve to position the insole upon contact with the peripheral edge portion thereof at four tangential points 127, 128, 129 and 130. The area common to right and left mated insoles, when they are properly positioned by the toe and heel guide assemblies 42 and 44, is shown in FIGURE 21 by the cross hatched area 12, and may be defined in the following manner: if any contoured insole has an opposed or mirror image of its contoured outline superimposed thereon, an area 12 is formed common to both insole outlines, whether right or left, within which adhesive material may be directly applied. Thus the opposed image of an insole represents the mating member of a matched pair of right and left insoles. Regardless of the peripheral configuration or shape of an insole, there will be an area 12 which is common to both right and left mating insoles and of sufficient length and width that adhesive material may be applied within the defined area.

POSITIONING OF INSOLE PRIOR TO TAPING

*Heel Guide Adjustment*

In operation, the operator adjusts the heel guide assembly 44 by moving it longitudinally backward or forward along slot 131 formed in the heel plate section 126 of the deck assembly, locking the heel guide assembly in adjusted position by means of heel guide locking screw 132. Positioning the heel guide assembly 44 along slot 131 determines the ultimate spaced relation between the terminal end 35 of a strip of tape 30 and the heel end 13 of an insole 10.

Since no precise positioning is required in loading an insole in the tape applying station 100, the operator merely places the insole on table plates 124, 125 and 126 between the adjusted heel guide assembly 44 and the open, retracted, toe guide assembly 42. This is particularly significant if the operator inadvertently reverses the direction of introduction of the insole into the machine. Conversely, this can be performed whenever desired without affecting the operation of the equipment since the insole may be turned around or rotated 180° and tape applied from the toe portion 14 to the heel portion 13 of the insole 10 without further modification.

*Toe Guide Operation*

Figure 2:
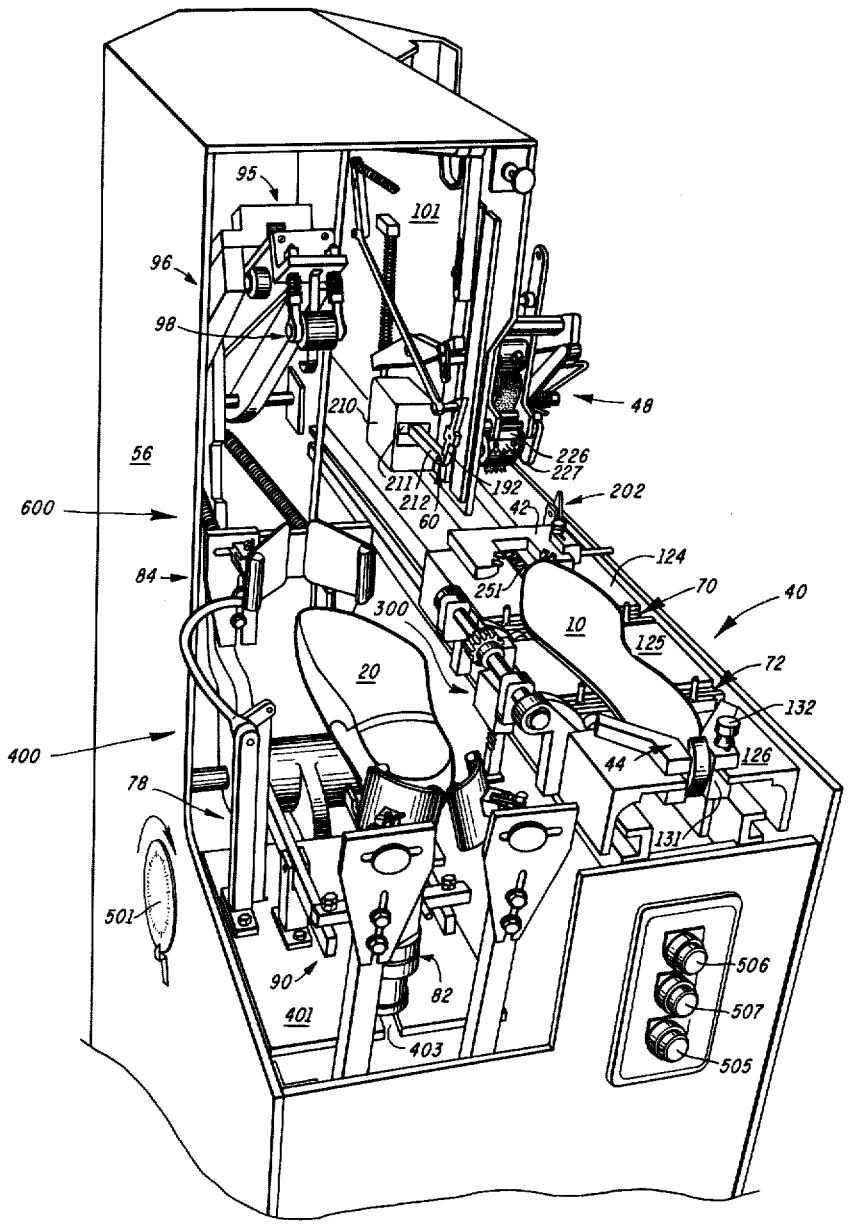
FIGURE 2 is a partial perspective view of the front left side of the apparatus illustrated in FIGURE 1.

When the insole 10 has been placed between the toe and heel guide assemblies 42 and 44, the toe guide is held open by means of a toe guide finger 133 secured to the inner deck rail 141, as shown in FIGURE 20. When the main shaft index 510 has reached 332°, as indicated in FIGURES 2, 22 and 29, the toe guide assembly 42 begins to close against the toe 14 of the insole and the included angle opening of the toe guide serves to longitudinally displace the insole 10 supported on deck assembly plates 124, 125 and 126 toward the heel guide assembly 44. Upon contacting the inner planar surfaces 134, 135, 136 and 137, which define the angular openings of the toe and heel guide assemblies 42 and 44, respectively, the insole is deflected into abutting contact at points 127—130 which are tangent to the peripheral curves of the insole edge at the point of contact.

The toe guide assembly 42, slidably mounted in slot 251 formed in deck toe plate section 124, is biased toward the heel guide assembly 44 by a spring 138. The amount of spring tension may be selectively varied by the operator according to the thickness, flexibility or type of insole, so that when the toe guide assembly 42 moves into contact with the insole toe 14, it will exert a force sufficient to align the insole 10 between the toe and heel guide assemblies 42 and 44 without causing buckling or distortion of the insole. As the toe guide assembly 42 contacts the insole, the insole abuts against the sides 134 and 135 upon which are mounted projecting fingers 139 and 140, as shown in FIGURES 20 and 21. These fingers are so disposed above toe plate section 124 that the insole is free to slide under each finger. As the deck assembly 40, carrying the toe guide assembly 42, moves rearwardly away from the operator, the toe guide assembly 42 moves away from the toe guide finger 133 mounted below the deck on inner rail 141, permitting spring 138 to close the toe guide assembly 42 against the insole 10. An adjustment screw 143 is provided on the toe guide finger 133 for varying the amount of opening between the heel guide assembly 44 and toe guide assembly 42.

Heel Guide Clamp

After the insole has been positioned between the toe guide assembly 42 and the heel guide assembly 44, the heel guide clamp assembly 144, upon further rearward travel of the deck assembly 40, moves downwardly and holds the end of the insole heel 13 against the heel plate section 126 of the deck assembly, in the manner illustrated in FIGURES 4 and 21. The heel guide clamp assembly 144 serves to maintain the insole 10 in position on the deck assembly 40 and prevents buckling as tape 30 is being applied to the insole in the manner illustrated in FIGURE 23. With reference to FIGURE 20, the heel guide clamp assembly which is disposed below the deck assembly 40 and mounted on the heel guide assembly 44, is actuated by a cam roller follower 145 biased by spring 252 against cam plate 146 mounted on the inside of outer rail 142 and operated by longitudinal movement of the deck assembly 40.

POWER DRIVE

Figure 24:
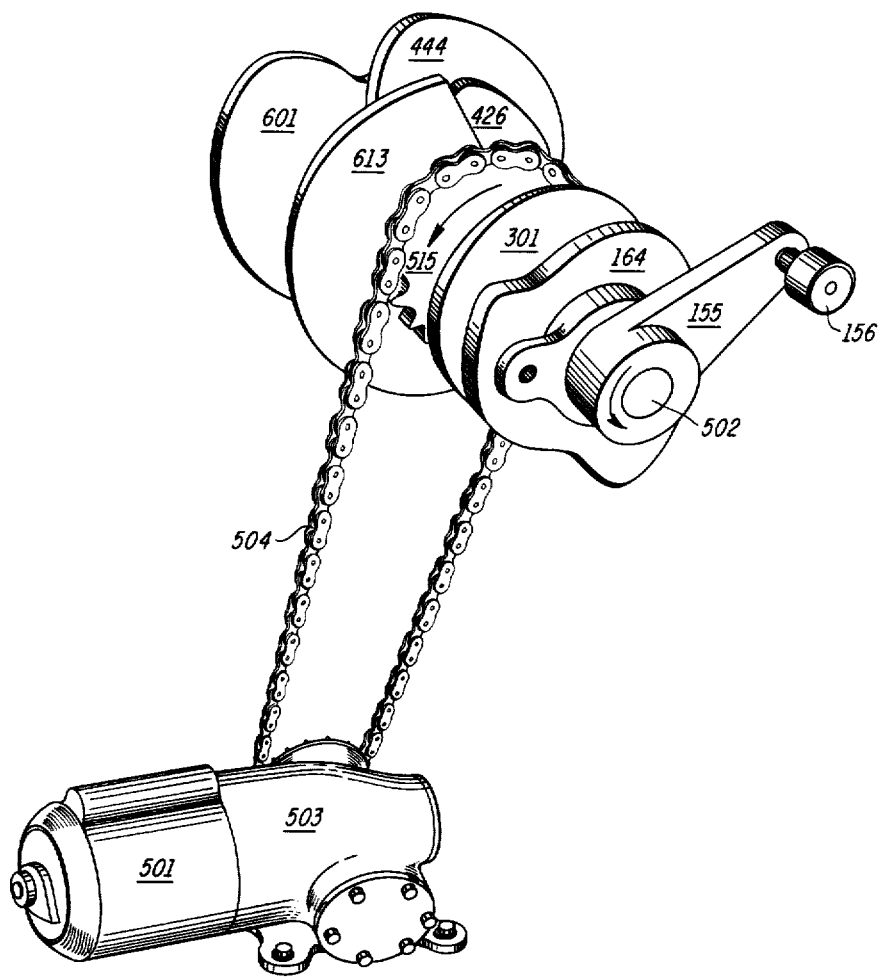
FIGURE 24 is a schematic perspective view of the main drive shaft and associated actuating cams coupled in timed relation to a driving unit.

As shown in FIGURE 24, a suitable power source, such as electric motor 501, may be employed to drive the main shaft 502 through a suitable reduction gear mechanism 503 and chain drive 504 interconnected by sprocket 515 with main shaft 502 on which are mounted various actuating cams, bearings and the deck crank arm 155. The deck crank arm 155, in turn, supports deck crank arm cam follower 156, as illustrated in FIGURE 20. Main shaft 502 rotates in a counterclockwise direction when viewed from the right hand side of the machine. Main drive motor 501 may be intermittently operated by switch 505 (FIGURES 2 and 19), or continuously by switch 511 which contains "on" button 506, and "off" button 507, after main switch 508 is actuated (FIGURE 3). A fuse cabinet 512 is also provided which contains circuit fuses 514 and main drive motor overload switch 513.

DECK ASSEMBLY MOVEMENT

Movable deck assembly 40, carrying the fixed but adjustable heel guide assembly 44 and the slidably mounted toe guide assembly 42 is mounted on deck rollers 154 carried within the inner inside rail 141 and outer rail 142 which in turn are supported by the structural framework 56, as illustrated in FIGURES 1 and 20. Also supported by the structural framework 56, is a lower pivot shaft 157 on which is pivotally mounted deck cam 158. Deck crank arm cam follower 156 is located within the interior opening 159 formed in deck cam 158. As the main shaft 502 is rotated, cam follower 156 travels within opening 159 of cam 158 causing the cam 158 to oscillate about lower pivot shaft 157 and impart an irregular oscillatory motion to the upper end of deck cam 158 which is provided with an integral counterweight 160. A cam roller follower 161 projects outwardly from the counterweight 160 and travels freely within a guide slot 162 formed in a depending extension 163 suspended from the lower deck plate 253 which in turn extends between and is secured to the toe plate section 124 and heel plate section 126 of deck assembly 40. The oscillatory motion of cam 158 and related follower 161 is translated into a reciprocating motion to impart longitudinal movement to the deck assembly 40. The foregoing deck drive mechanism imparts an irregular reciprocating motion to the deck assembly so that it initially travels faster toward the rear of the machine while the insole 10 is being displaced to aligned position and retained than it does during the return travel when tape 30 is being applied to the insole and thereafter released. When the deck assembly 40 returns to the forward part of the apparatus, it comes to rest and the insole 10 is then transferred to the associated aligning and combining section by the transfer arm assemblies 70 and 72. The deck assembly remains stationary for a sufficient time to permit the operator to reload the next insole and thereafter initiate another operating sequence.

TAPE APPLYING MECHANISM

Actuation

In order to initiate the application of tape to a positioned insole, the operator actuates the trigger mechanism 54 by pulling trigger knob 147 mounted on the forward edge of taping plate 101, as shown in FIGURES 1, 23, and 25 to 28. Trigger knob 147 is connected to a wire mounted within flexible cable 148, which wire passes through rocker bar pivot pin 149 and actuates trigger plate 150, pivotally mounted on top of the outer rocker bar 151. When trigger plate 150 is actuated, it pivots out over the top edge of the inner rocker bar 152. Both inner rocker bar 152 and outer rocker bar 151 are in turn pivotally mounted on the rocker bar pivot pin 149. A rocker bar plate 153 is rigidly mounted at the opposite end of the outer rocker bar 151 and likewise projects over the upper edge of inner rocker bar 152. As the outer rocker bar 151 pivots counterclockwise, rocker bar plate 153 presses downwardly and causes the adjacent inner rocker bar 152 to also pivot counterclockwise. When the operator actuates trigger knob 147, trigger plate 150 pivots out over and presses downwardly on the inner rocker bar 152 as the outer rocker bar 151 moves in a clockwise direction. Whenever the operator desires to interrupt the application of tape, trigger knob 147 is pushed in to return trigger plate 150 to inoperative position.

The tape applying cam 164, illustrated in FIGURE 24, is mounted on main shaft 502 and through an interconnected cam follower linkage, not shown, imparts an intermittent reciprocating motion to rod 167. In turn, rod 167 is connected at its upper end to the outer rocker bar 151 by an adjustable swivel connection 169 to impart an intermittent rocking motion to the outer rocker bar 151 which is transmitted to the inner rocker bar 152 by rocker bar plate 153 and trigger plate 150 when the latter has been actuated.

Hinged at the opposite end of inner rocker bar 152 and extending downwardly is a bar 170 having a slotted opening 171. Mounted on each side of a vertical opening 180 formed in the forepart of taping plate 101 are channel rails 172 and 173 which define a vertical guideway for upper and lower rollers 174 and 175 (FIGURE 17) mounted on pins 176 and 177, respectively (FIGURES 17 and 25), that extend laterally from the inner roller arm 178 of the tape applying assembly 48.

Figure 25:
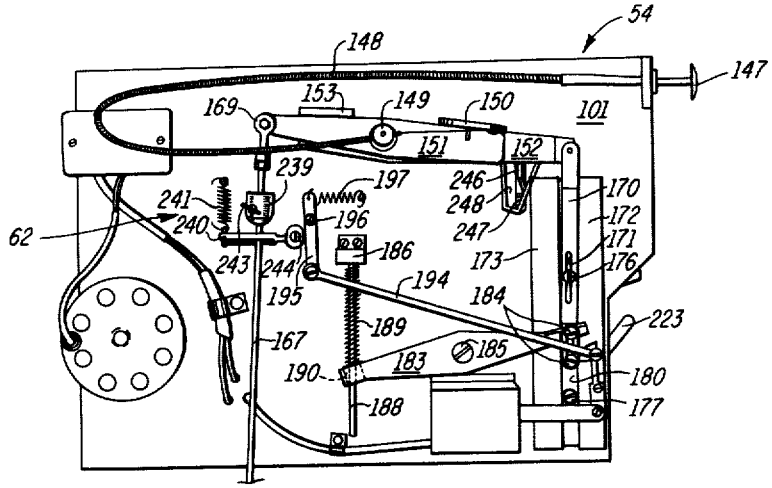
FIGURE 25 is a partial perspective view, with parts removed, showing the inner face of the taping plate and related components for actuating the tape applying assembly prior to the tape transfer sequence.
Figure 26:
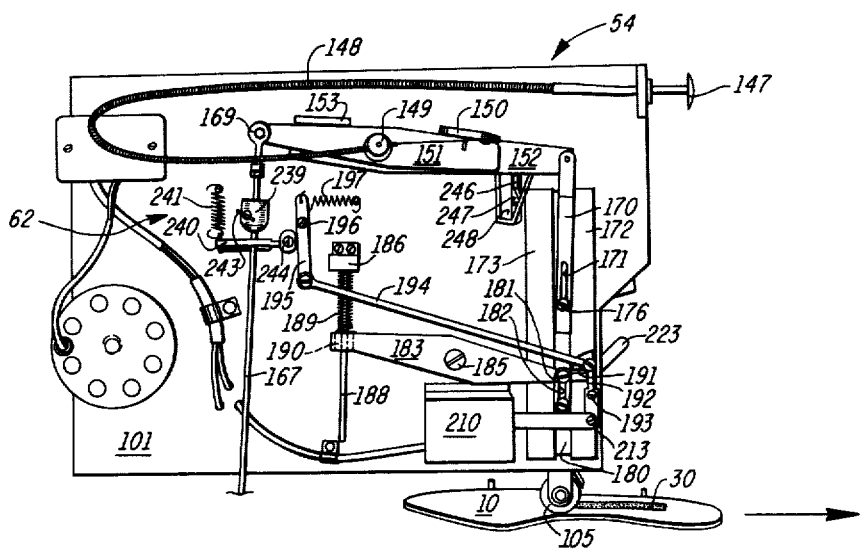
FIGURE 26 is a partial perspective view, similar to FIGURE 25, with parts removed, showing the position of actuating components while tape is being applied to an insole.

As illustrated in FIGURE 17, a bracket 179 is attached to the inner roller arm 178, between rollers 174 and 175, and extends through opening 180. Connecting link 181 (FIGURE 25) interconnects the end of bracket 179 (FIGURE 17) with lifting arm 183 (FIGURE 26) by means of upper and lower pins 184 (FIGURE 25) passing slidably through opening 182 (FIGURE 26). Upper roller pin 176 extends through the opening 180 and through the slot 171 formed in bar 170. Lifting arm 183 pivots on pin 185 which extends laterally from the inner side of taping plate 101. Rod 188, pivotally mounted on bracket 186, extends downwardly passing through a compression spring 189 and in turn through an opening 190 formed in the end of lifting arm 183.

On the outer side of taping plate 101, tape applying assembly 48 is guided by rollers 174 and 175 to move up or down the vertical channels 172 and 173 upon actuation by the related linkages mounted on the inner side of taping plate 101, in sequence as diagrammed in FIGURE 29.

TAPE APPLYING

After the operator has actuated trigger mechanism 54 to taping position and as the deck assembly 40 moves longitudinally forward carrying the positioned insole 10 between the toe and heel guide assemblies 42 and 44, outer rocker bar 151 pivots clockwise and the attached trigger plate 150 causes the inner rocker bar 152 to also pivot clockwise in unison. As shown in FIGURE 25, bar 170 moves downwardly pushing against the forward end of lifting arm 183 causing arm 183 to pivot clockwise about pin 185 and compress spring 189 on rod 188 between bracket 186 and arm 183. The forward end of arm 183 is moved downwardly until it catches under the lip 191 of latch 192, as illustrated in FIGURE 26. Latch 192 pivots on pin 193 and is biased counterclockwise by related rod 194, which in turn is actuated by follower arm 195 pivoting about pin 196 and biased clockwise by spring 197. The tape applying assembly 48 and related support bracket 179 are interconnected with connecting ling 181 by lower pin 184 while the opposite end of connecting link 181 is interconnected with arm 183 by upper pin 184 so that the tape applying assembly can be lowered until the applying roller 105 is pressed against the insole 10 with the terminal portion 35 of tape 30 interposed therebetween, as shown in FIGURE 17. The deck assembly 40 continues to move longitudinally in a forward direction while tape is being applied to the insole, as shown in FIGURES 5 and 6 and more fully described hereinafter.

When the tape applying assembly 48 is in lower tape applying position, lifting arm 183 is restrained by the forward end being caught under the lip 191 of latch 192 while the opposite end is biased downwardly by spring 189. The tape applying assembly 48 and related bracket 179 mounted on the inner roller arm 178 will rise and fall during the application of tape according to the thickniss or vertical profile of the insole 10. The opening 182 in connecting link 181 permits this motion by allowing relative movement to occur between the upper and lower connecting pins 184. Sufficient pressure to transfer the tape 30 to insole 10 is obtained by the weight of the tape applying assembly 48.

After the tape applying assembly 48 has been lowered to applying position, tape applying cam 164 and its related cam follower mechanism simultaneously actuates the interconnected outer and inner rocker bars 151 and 152 which move in a counterclockwise direction, lifting the bar 170 until the lower end of slot 171 is just under but not touching pin 176. The tape applying apparatus 48 and its related mechanisms are then in position to permit severance of the tape. As the deck assembly 40 moves longitudinally forward, the applying roll 105 presses downwardly to transfer the tape 30 to the insole 10, in the manner more fully described hereinafter.

TAPE SEVERING

As illustrated in FIGURES 5, 6, 7 and 23, a trigger pin 198 is adjustably mounted on the outer side of toe guide assembly 42. The trigger pin holder 199 is provided with a locking screw 200 permitting a range of longitudinal adjustments parallel to the direction of movement of the deck assembly 40. In addition, a series of sockets 201, located on the outer side of the trigger pin holder 199, permit the trigger pin 198 to be relocated with respect to the toe guide assembly 42. The trigger pin 198, with its related holder 199, moves in unison with the toe guide assembly 42 as the latter is actuated longitudinally in positioning the insole 10. The longer the insole, the greater is the relative distance separating the toe guide assembly 42 and trigger pin 198 from the heel guide assembly 44. As illustrated in FIGURE 1, trigger pin 198 extends laterally between the toe plate section 124 of the deck assembly 40 and the structural framework 56.

Attached to the outer rail 142 and extending upwardly between the structural framework 56 and the deck assembly 40, is a severing switch mechanism 202. This mechanism includes an upstanding support member 203 carrying a pivot pin 204. The pivot pin 204 carries a dependent switch arm 205 upon the lower end of which is adjustably mounted a mercury switch 206 with flexible wire leads 208. Also mounted on pivot pin 204 is a switch finger 207 having a lateral projection 209 on its lower forward edge.

As the trigger pin 198, carried by the deck assembly 40, moves in a longitudinal direction first rearwardly and then forwardly during the tape applying cycle, it will contact and deflect the upstanding switch finger 207 pivotally mounted on pin 204. As the trigger pin moves rearwardly, switch finger 207 is deflected in a clockwise direction and no action is imparted to the switch arm 205. As the trigger pin 198 moves forwardly in the manner illustrated in FIGURE 6, it contacts the upper extremity of switch finger 207, pivoting the same in a counterclockwise direction and causing projection 209 to deflect switch arm 205 in a counterclockwise direction in order to actuate mercury switch 206 to a closed position. As trigger pin 198 continues to move forward, it disengages contact with switch finger 207 allowing it and arm 205 to return by gravity to a vertical position causing mercury switch 206 to return to the "off" position.

Figure 19:
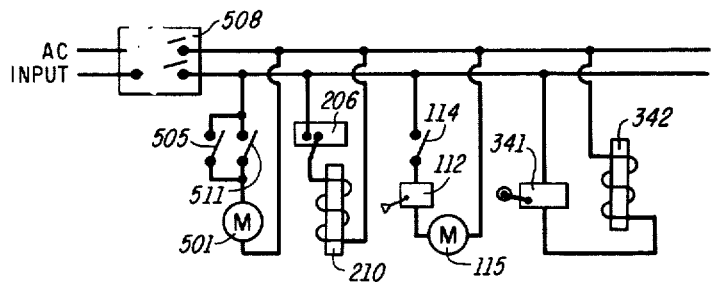
FIGURE 19 is a schematic wiring diagram illustrating the electrical circuit of the apparatus.
Figure 27:
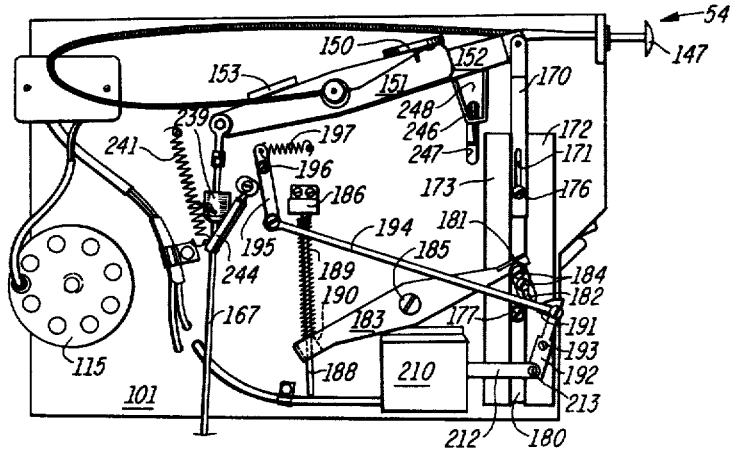
FIGURE 27 is a partial perspective view, similar to FIGURE 25, with parts removed, showing the position of the actuating components after the tape has been severed during elevation of the tape applying assembly to raised position.

As shown in FIGURES 2, 19 and 27, mercury switch 206 is electrically connected to actuate severing solenoid 210 mounted on the lower inner side of taping plate 101. The armature 211 of solenoid 210 (FIGURE 2) is connected to a pin 213 on the lower end of latch 192 by link 212 (FIGURE 27). When solenoid 210 is actuated, the armature 211 moves toward the rear of the machine pulling on link 212 and pivoting latch 192 about pin 193 in a clockwise direction until latch lip 191 moves away from and unlocks lifting arm 183. Spring 189 having been compressed, now presses downwardly guided by means of rod 188 on arm 183 which pivots in a counterclockwise direction lifting upper pin 184 on arm 183 that in turn lifts connecting link 181. This link in turn lifts lower connecting link pin 184 which is attached to bracket 179 causing the tape applying assembly 48 to move upwardly. The tape applying assembly 48 is guided perpendicularly upward by rollers 174 and 175 that move within channel rails 172 and 173.

Figure 23:
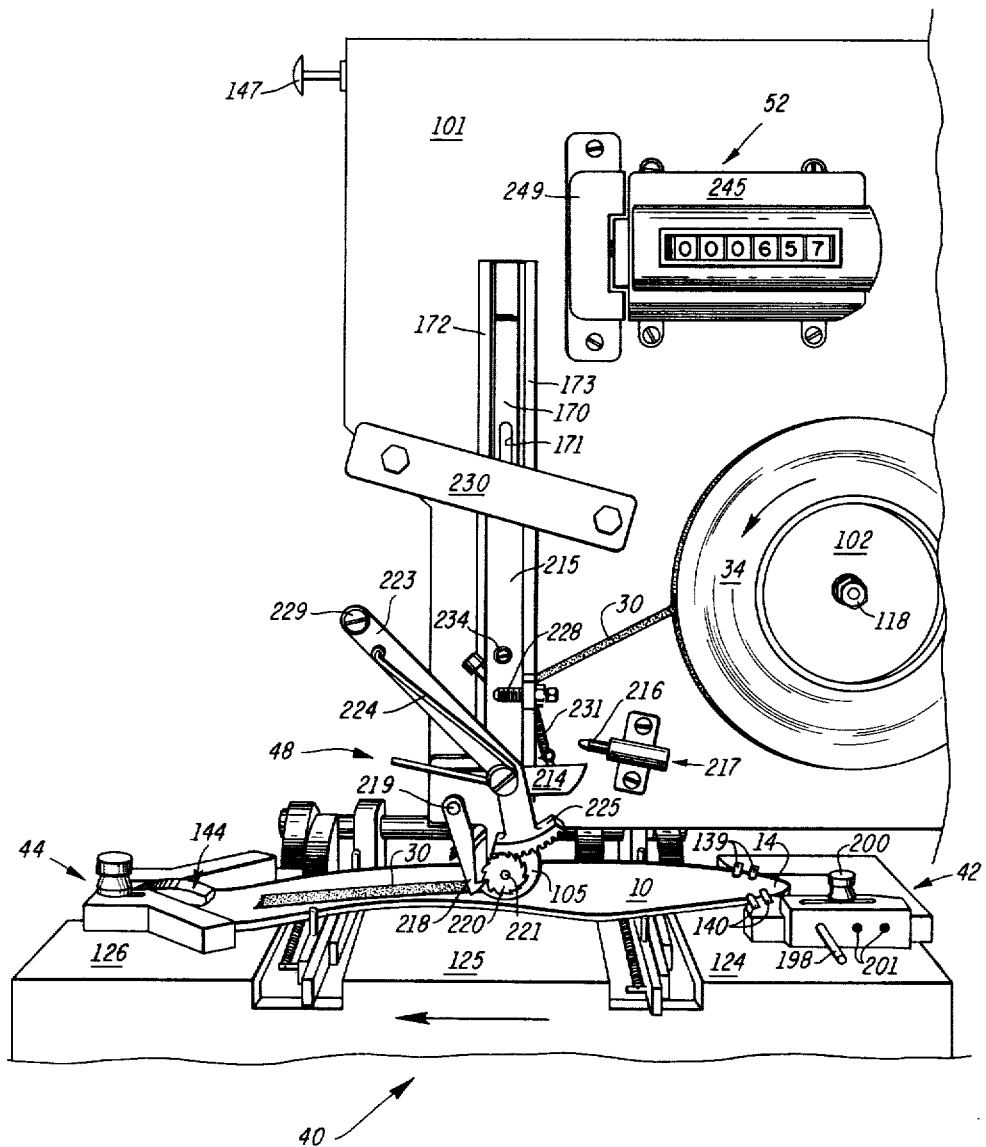
FIGURE 23 is a partial perspective side view, with parts removed, of the tape applying assembly during the application of tape to an insole.
Figure 28:
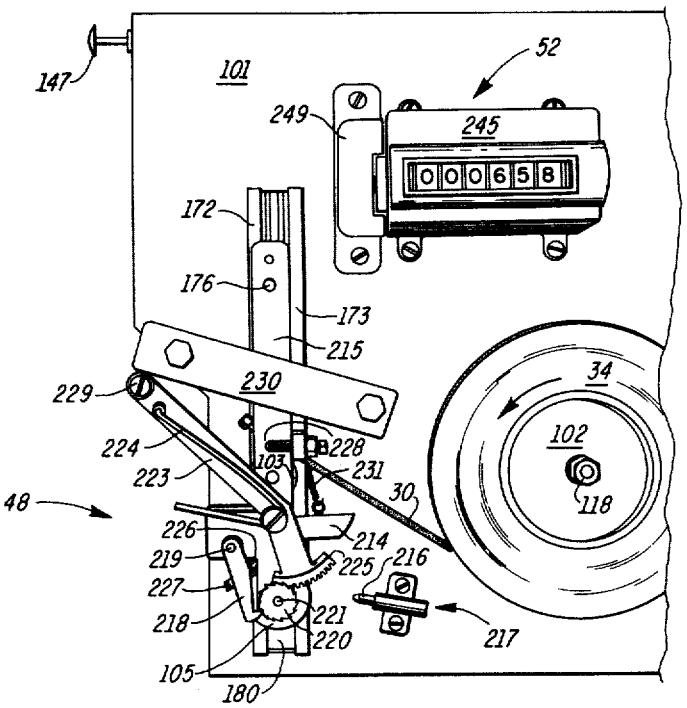
FIGURE 28 is a partial perspective view of the outer taping plate assembly, with parts removed, showing the tape applying assembly in raised position.

As shown in FIGURES 6, 21 and 23, when the tape applying assembly 48 has moved vertically to a position where a space of approximately one-half inch exists between the applying roll 105 and the insole 10, the toe 14 of the insole is restrained from following the tape 30 upwardly by the toe guide projecting fingers 139 and 140. The power bar pawl arm 214, which is mounted between the inner and outer roller arms 178 and 215, will be tripped by contacting detent button 216 of the power bar trip assembly 217 mounted on the outer face of taping plate 101. In FIGURES 6, 23 and 28, power bar pawl finger 218, which is mounted on shaft 219, as is also arm 214, will move in a clockwise direction away from, and thereby release, the applying roll ratchet 220 so that the ratchet may turn. The ratchet 220 is fixed on applying roller shaft 221. Located between the ratchet 220 and the outer roller arm 215, is an applying roll gear 222, illustrated in FIGURE 30. Power bar 223 is also mounted on the outside of roller arm 215 and is powered by the power bar spring 224, as illustrated in FIGURES 2, 23 and 28. The power bar 223, by means of its toothed gear segment 225, causes applying roll gear 222 and therefore shaft 221 to rotate in a counterclockwise direction. Cutter arm 226, which carries cutter blade 227, is also mounted on shaft 221 which, in turn, rotates, whereupon cutter blade 227 is rotated counterclockwise to sever tape 30. The extent of rotation of cutter blade 227 may be adjustably controlled by a power bar stop member 228.

COCKING

As diagrammed in FIGURE 29 and illustrated in FIGURES 2, 27 and 28, after the tape 30 has been severed, tape applying cam 164 and its related cam follower mechanism are actuated to simultaneously pivot inner rocker bar 152 and outer rocker bar 151 in a counterclockwise manner, causing bar 170 to be pulled upwardly. The lower end of slot 171 formed in bar 170 contacts upper roller pin 176, projecting through the slot 171, and lifts the pin 176 upwardly, carrying tape applying assembly 48 upwardly to which the pin 176 is secured. The tape applying assembly 48 is guided vertically upward by the rollers 174 and 175, running in front and rear channel rails 172 and 173. The tape applying assembly 48 continues to lift upwardly forcing power bar roller 229 against power bar cam 230 which causes bar gear arm 223 and gear segment 225 to pivot counterclockwise rotating the cutter blade 227, gear 222 and ratchet 220 clockwise until the cutter blade 227 has returned to retracted, cocked position at which time spring 231, connected to the upper leg 214 of the power bar pawl finger 218, causes the latter to engage ratchet 220 locking cutter arm 226 in cocked position. After the cutter arm 226 has been cocked, the tape applying cam 164 and its related cam follower mechanism are actuated to lower bar 170 from a remote upward position to an intermediate position such that the lower end of bar 170 is almost touching the forward end of arm 183. Spring 189 now acts on the end of arm 183 to counterbalance the weight of the tape applying assembly 48 exerted by lower pin 184 on connecting link 181 and on upper pin 184 mounted on the forward end of arm 183. The taping assembly 48 is then in a position of equilibrium with the bottom of applying roll 105 elevated above the deck assembly 40 at a height sufficient to clear the toe guide assembly 42 and the heel guide assembly 44.

TAPE LOCK

Referring now to FIGURES 2, 17 and 28, as tape applying assembly 48 is raised upwardly prior to severance of the tape 30 and also when the power bar 223 is cocked, the distance between the tape lock roll 103 and the roll of tape 34 increases. This would ordinarily cause the tape 30 to be pulled backwardly, up and away from the applying roller 105 as the roller arms 215 and 178 are raised upwardly. This reverse feeding or backlash of the tape 30, when roller arms 215 and 178 are raised upwardly, is prevented by a tape lock assembly which includes a pawl 104 with a sharp edge 233, or point, or series of points, pinching the tape 30 between roller 103 rotatably mounted on shaft 232 and pawl 104. The pawl 104 rests by gravity against roller 103, pivoting about pawl shaft 234.

Referring to FIGURE 30, the applying roller assembly 105 contains a central core 235 rotatably mounted on shaft 221. On the core 235 are mounted two outer cylinders 236 as well as a center disk 106. Inside the core 235 is an antibacklash ball 237, biased by spring 238 against outer roller arm 215 to prevent the tension of tape 30, when cut by cutter blade 227, from rotating the applying roller assembly 105 in a counterclockwise direction. In this way the cut or terminal end of the tape 30 will always remain beneath the central axis of the applying roller assembly 105. As the tape applying assembly 48 moves downwardly against the insole 30 it will press the terminal end 35 of the tape against the positioned insole.

APPLYING ROLL

While any suitable type of material may be employed in constructing the applying roller assembly 105, and bearing in mind certain variable conditions that must be taken into consideration in transferring tape from a surface of contact possessing a value of adhesive bond less than that required to establish an adhesive bond with the insole, more fully described hereinafter, the applying roll utilized in the present invention comprises a pair of outer cylindrical rolls 236 of silicone rubber material having ground, rough, or serrated peripheral surfaces separated by a central disk 106 composed of fibre or pure gum rubber. In this connection, it should be understood that the silicone rubber cylindrical rolls 236 are desired since they serve to exert a bonding pressure on the strip of tape 30 during the time it is being directly applied to the insole 10 without establishing an effective adhesive bond with the silicone roll, whereas, the tape 30 will only adhere directly to the central disk 106 so that the terminal end 35 of the tape will be retained on the applying roller assembly 105 after severance through adherence to the central disk 106 in proper position to be subsequently transferred during the next applying cycle.

TAPE TRANSFER

The tape 30 does not stick to the silicone rubber cylinders 236, making up the right and left sections of the applying roller assembly 105, but instead adheres only to the center disk 106. This is due to the chemical and physical characteristics of the silicone rubber cylinders. When the tape 30 is pressed between the applying roller assembly 105 and the insole 10, as the deck assembly 40 moves longitudinally forward rolling tape onto the insole, the tape is transferred directly to the insole 10 from the applying roller assembly 105, as illustrated in FIGURES 5, 17, 23 and 26.

For the purposes of definition, the various terms used herein to describe the characteristics of the pressure-sensitive tape are in accordance with the standards specified by the Technical Commission of the Pressure Sensitive Tape Council, Glenview, Illinois, for "Test Methods for Pressure Sensitive Tapes" appearing in Bulletin STC-1, issued September 1955 and revised May 1959.

The resistance to normal and lateral forces, or a combination of these forces, on each side of the tape may be expressed as a function of the area of the tape, the tensile and shear adhesion values of the tape, and the empirical factor $k$:

$$R = A \times T \times k$$

wherein R is the resistance to normal and lateral forces on each side of the tape, tending to either separate or misalign the surfaces of contact to which the tape is applied, A is the area of the tape, T is the minimum value of the peel or shear adhesion and $k$ is an empirical constant which is based upon such items as: the age and temperature of the tape as well as the temperature, cleanliness and finish of the contacted surfaces, as more fully described in our Patent No. 3,052,904, granted September 11, 1962, referred to above.

When the double-faced, pressure-sensitive adhesive tape contacts and adheres simultaneously to one or more surfaces on either one or both faces of the tape, which faces may possess different adhesive characteristics, and surfaces of contact possess different areas, or effective net areas, of adhesion subject to different $k$ factors, then the adhesive tape will adhere ultimately to that area of contact which exhibits the greatest value of "R" when subjected to a force of separation, and the tape will progressively separate from each surface of contact, according to the ascending values of "R" exhibited by the respective contact areas.

It should be understood that the internal cohesive strength of the adhesive tape must be greater than the adhesive bonds developed between any face and any surface of contact, so that the tape will not delaminate. However, it should also be noted that other factors, such as tension applied in stripping the tape from the roll, inertia, movement and the time necessary to develop a full physical and/or chemical bond at each area of contact are not considered. As a result, it is possible to utilize both faces of the double-faced, pressure-sensitive tape to aid in directly transferring the tape from one surface of contact to another. Between a minimum value of "R" possessed by any free tape surface, and a maximum value of "R" which exists in an adhesive bond established between any face of the tape and an ultimate surface of contact, intermediate contacting surfaces may be introduced within this range of R values so long as the intermediate contacting surfaces progressively exhibit ascending values of R less than the maximum value of R.

In this apparatus, the tape 30 will adhere to the center disk 106 of the applying roller assembly 105 when the tape applying assembly 48 is raised upwardly above the insole 10 because the center disk exhibits a higher value of "R" than the opposite free face of the tape which is not in surface contact and therefore does not develop a value of "R." In other words, since the free side of the tape lacks any area of contact, the value of "A" equals zero. Also, when the tape is pressed between the applying roller assembly 105 and the insole 10 and the applying roll is moved along the top surface of the insole to develop an adhesive bond, the tape will adhere to the insole and separate from the applying roll disk 106 because the value of "R" exhibited between the surface of contact of the tape and insole is greater than the value of "R" exhibited by the surface of contact between the tape 30 and the center disk 106 of the applying roller assembly 105. In this manner, if necessary or desirable, additional intermediate rollers to direct or to transfer, turn, apply and release, or any combination of these functions, may be interposed between the tape lock roll 103 and the insole provided that the value of "R" developed at each contact of the tape after leaving roll 103 and progressing to the insole 10 is progressively of a higher value of "R." On the other hand, the tape will not develop any effective adhesive bond with the silicone cylinders 236 because this material possesses physical and chemical characteristics which exhibit no significant value of R.

INSOLE RELEASING

After tape 30 has been applied to the insole 10 and the tape severed, the deck assembly 40, bearing the positioned insole retained between the heel guide assembly 44 and toe guide assembly 42 moves longitudinally toward the forward end of the machine. As shown in FIGURES 7, 20 and 29, at approximately 100° of the main shaft index 510, the heel clamp mechanism 144 begins to open upon actuation by follower 145 when the latter contacts plate cam 146. At approximately 74° of the main shaft index 510, the heel clamp is in the open retracted position and separated from insole 10.

As the deck assembly 40 moves toward the forward end of the apparatus, the toe guide assembly 42 begins to open at approximately 65° of the main shaft index 510 and is fully opened to a retracted position away from the insole, at approximately 39° of the main shaft index 510, as the toe guide assembly 42 is actuated by the toe guide finger 133. The deck assembly 40 then moves to the forward end of the machine and comes to rest at approximately 39° of the main shaft index 510 in order to permit the insole 10 to be transferred to the associated aligning and combining section of the machine.

SAFETY RELEASE MECHANISM

Should electrical or mechanical malfunction occur in the mechanisms to prevent the solenoid 210 from being actuated when it is desired to sever the tape, a safety release mechanism 62, as illustrated in FIGURES 25 to 27, will actuate latch 192 and release arm 183 from under the latch lip 191, before the tape applying cam 164 actuates its related follower mechanisms which serve to cock the power bar 223, by elevating bar 170 and tape applying assembly 48. Bracket 179, secured to the inner roller arm 178 of the tape applying mechanism, would rise and contact the forward end of arm 183 secured by latch 192. Continuing exertion by tape applying cam 164 to effect the further elevation of the latched down tape applying assembly 48 would result in failure or damage to the apparatus.

The safety release mechanism 62 serves to obviate this possibility. As illustrated in FIGURES 25 to 27, a release ball 239 is adjustably located on the upper portion of actuating rod 167 by means of set screw 243. The ball 239 is so disposed so that as rod 167 moves downwardly, when the main shaft index 510 is approximately 93° at which point cocking of the power bar 223 is commenced, it will begin to bear downwardly against forked cam 240 pivoting about pin 244 and biased by spring 241. Cam 240 then deflects follower arm 195 counterclockwise which causes rod 194 to pivot latch 192 about pin 193 and unlatch arm 183 biased by spring 189, thereby permitting the tape applying mechanism 48 to move upwardly and causing the tape to be severed.

RECORDING COUNTER

In order to provide for a record of the quantity of work actually performed by the machine, a counter assembly 52 is located on the upper outer portion of the taping plate 101. A suitable reciprocating ratchet counter 245 is mounted as illustrated in FIGURES 27 and 28. A ratchet arm 246 extends from the counter 245 through a slotted opening 247 in taping plate 101 and continues through a longitudinal opening 248 in the forward portion of the inner rocker bar 152. Actuation of the counter 245 is effected when the forward end of the inner rocker bar 152 moves downwardly below the middle position to lower the tape applying assembly 48, as shown in FIGURE 25. The top of the opening 248 in inner rocker arm 152 presses the ratchet arm downwardly actuating the counter. As the inner rocker bar 152 rises to an intermediate position, the counter mechanism 245 returns the ratchet arm 246 to its initial position. As the inner rocker bar 152 pivots upwardly, the ratchet arm 246 remains stationary in the opening 248 located in the inner rocker bar 152. A suitable housing 249 is attached and secured on the outer side of the taping plate 101 adjacent the counter 245 covering the ratchet arm.

TRANSFERRING OF TAPED INSOLE

Figure 16:
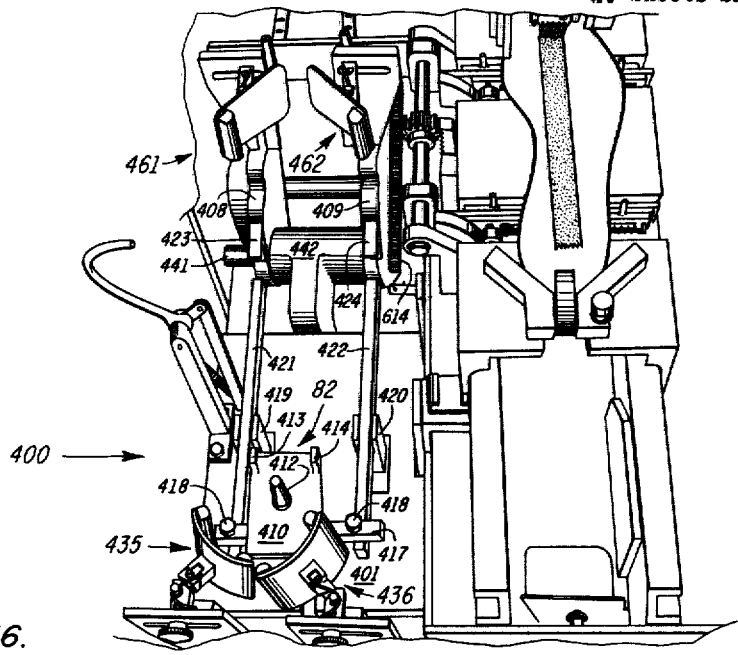
FIGURE 16 is a partial perspective view, similar to FIGURE 15, after removal of the detachably assembled insole and last.
Figure 31:
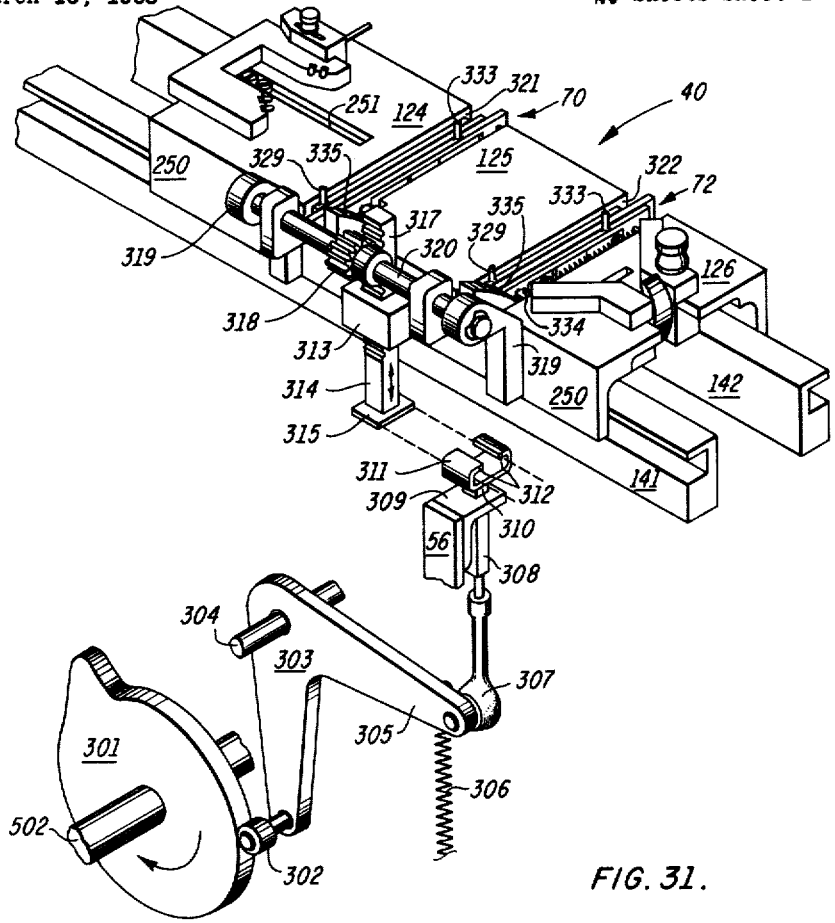
FIGURE 31 is a partial isometric view, with parts removed, of the associated movable deck and rotatable transfer assemblies and related transfer actuating components.

As tape 30 is being applied to the insole 10, the operator loads a related last 20 into the aligning station 400 of the machine by mounting the last on a heel rest assembly 82 so that the insole supporting bottom surface 22 of the last is inverted and faces upwardly, as illustrated in FIGURES 1 and 16. When the main shaft 502 rotates so that the main shaft index 510 indicates approximately 30°, as diagrammed in FIGURE 29, the transfer cam 301, mounted next to the tape applying cam 164 on main shaft 502, rotates and actuates cam roll follower 302 mounted on the lower end of follower arm 303 which is pivotally journalled to shaft 304 carried by the structural framework 56 of the machine, as illustrated in FIGURES 8, 24 and 31. As follower 302 is deflected and arm 303 pivots about shaft 304, the upper end 305 of arm 303 moves upwardly extending spring 306 which is attached at its opposite end to the structural framework of the machine. A rod 308, of rectangular cross section, is attached to the opposite upper end 305 of arm 303 by means of a swiveled hinged connection 307. Rod 308 passes through a rectangular opening 310 formed in an adjacent bracket guide support 309 which is attached to and supported by the structural framework 56. On the top of the rod 308, above bracket 309, is a fixed channel shaped head piece 311, with inwardly turned projections 312 disposed at the end of each side of the channel.

Attached to the side plate 250 of deck assembly 40, is a holder piece 313 in which is slidably mounted an upper rod 314 of rectangular cross section. The upper portion of rod 314 is in the form of a rack 317 having teeth which mesh with a related pinion gear 318 centrally disposed on a transfer shaft 320 rotatably mounted in bearing holders 319 attached to the side plate 250 of deck assembly 40. Transfer shaft 320 extends parallel to and is located at a point midway between the longitudinal center line of the deck assembly 40 and the longitudinal center line of the aligning station 400 of the machine. Transfer shaft 320 has its longitudinal axis disposed approximately one-half inch above the upper face of deck sections 124, 125, and 126.

Figure 32:
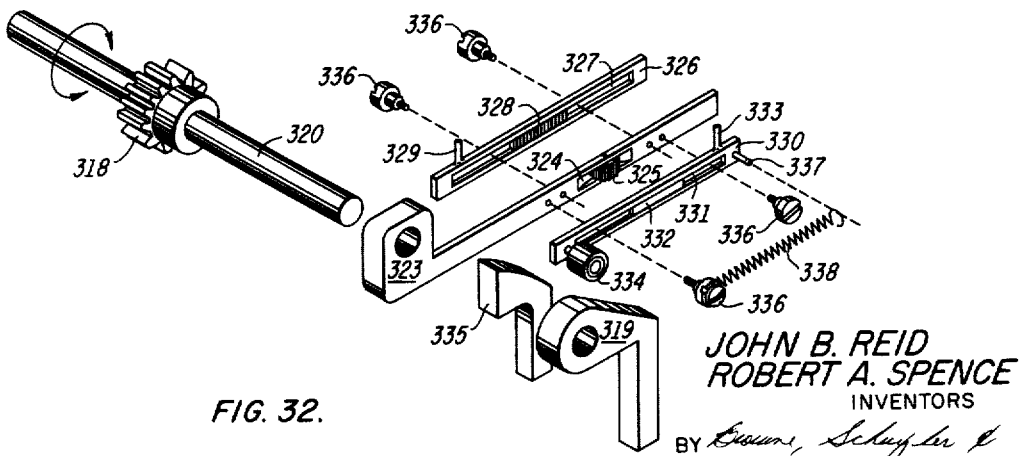
FIGURE 32 is an exploded isometric view of one of the transfer arm assemblies.

A toe transfer arm assembly 70 and heel transfer arm assembly 72 are located on each side of the transfer pinion gear 318 between the bearing holders 319, as generally indicated on FIGURES 1, 31 and 32. Each transfer arm is offset so that the upper surface thereof is located slightly below the elevation of the deck plate sections 124, 125 and 126 when arms 70 and 72 are retracted within the slots 321 and 322, respectively. Each arm is so disposed and mounted on shaft 320 that when the latter is rotated 180° in a counterclockwise direction, arms 70 and 72 will move upwardly out of slots 321 and 322 and travel an arcuate path until they are approximately one inch above the bottom surface 22 of last 20.

Since the toe and heel transfer arms 70 and 72 are similar in construction, the following description is applicable to both arm assemblies. As shown in FIGURE 32, center bar 323 is mounted in offset relation on shaft 320 and contains a longitudinally extending rectangular opening 324. Pinion gear 325 is rotatably mounted in the slotted opening 324 so that its transverse axis is disposed at the center of the bar. Slidably mounted along the rear of center bar 323 is a rear bar 326 which has a longitudinal slotted opening 327. Mounted within the opening 327, and offset to one side of the transverse center line of the center bar 323, is a section of rack teeth 328 designed to mesh with pinion gear 325. An upstanding pin 329 is mounted on the upper edge of rear bar 326 adjacent the terminal end thereof. A second bar 330 is slidably mounted in front of center bar 323. Front bar 330 also contains a rectangularly slotted longitudinal opening 331 and an opposed offset section of rack teeth not shown, which are positioned to mesh with pinion gear 325, as well as an upstanding pin 333 located at the opposite end of bar 330 along the upper edge thereof. A cam roll follower 334 is mounted on the opposite end of front bar 330 from pin 333. The rear bar 326 and the front bar 330 are retained in opposed sliding relation against opposite faces of the center bar 323 with the respective rack sections simultaneously meshing with pinion gear 325 so that lateral movement of the front bar 330 in one direction imparts a movement in the opposite direction to the related rear bar 326. Retainer pins 336 are biased toward each other by means of spring 338 connected at its opposite end to pin 337. Mounted on the side plate 250 of deck assembly 40 and suitably disposed to contact the cam follower 334 of toe transfer arm 70 as well as the cam follower 334 of heel transfer arm 72, are two cams 335. When the toe and heel transfer arms 70 and 72 are in their normally lowered, retracted position disposed within slots 321 and 322, which separate deck plates 124 and 126 from the intermediate deck plate 125 of deck assembly 40, the cams 335 are biased against the cam roll followers 334 of the toe and heel transfer arms 70 and 72 causing the upstanding pins 329 and 333 to separate and remain in an open insole receiving position.

When the main shaft 502 has rotated so that the deck assembly 40 is in the forward stopped position, the insole 10, to which a strip of tape 30 has been previously applied along the upwardly facing last contacting surface 11 has been released. Transfer cam 301 then actuates follower 302 and follower arm 303 which push upwardly on rod 308, as illustrated in FIGURE 31. When the deck assembly 40, carrying upper rod 314, moves to a forward position on the machine, the lower shoulder portion 315 of rod 314 enters the channel shaped head piece 311 secured to rod 308 and comes to rest.

As transfer cam 301 moves rod 308 upwardly, the channel shaped head piece 311 forces rod 314 upwardly which in turn is guided by holder piece 313. Rack 317 of rod 314 pushes upwardly causing pinion gear 318 to rotate in a counterclockwise direction. Gear 318 rotates shaft 320 carrying the toe and heel transfer arm assemblies 70 and 72. As the transfer arms 70 and 72 rise out of slots 321 and 322 and rotate in a counterclockwise direction lifting the previously taped insole 10, the separating action of cam follower 334 on each transfer arm gradually decreases allowing the pins 329 and 333 to move toward each other under the biasing influence of spring 338 which actuate the front bar 330 and rear bar 326 of each transfer arm causing pins 329 and 333 to move in opposite directions until each pin engages a related side edge portion of the taped insole so that the forepart and heel portion thereof are grasped and supported upon the transfer arms 70 and 72. After grasping the insole, the transfer arms continue to rotate counterclockwise until 180° of rotation has been achieved coming to rest in a position where the inverted insole is disposed in generally superimposed corersponding relation over the related bottom surface 22 of last 20 and spaced therefrom. The last contacting surface 11 of insole 10, bearing the strip of tape 30, is now facing downwardly. The stripper assembly 78 is then actuated to strip the insole 10 from between the holding pins 329 and 333 of the toe and heel transfer arms 70 and 72 to deposit the insole upon the bottom surface of last 20, as illustrated in FIGURE 9, and more fully described hereinafter. Thus, it should be understood that the transfer arms 70 and 72 remain in retracted position within the deck assembly 40 as the latter moves longitudinally during the tape applying sequence since the transfer actuating mechanisms remain disengaged until the deck assembly 40 has returned the taped insole to transfer position.

STRIPPING OF TAPED INSOLE FROM TRANSFER ARMS

Referring now to FIGURE 33, stripper cam 339 is mounted on the outer face of combining roll vertical cam 601 which in turn is secured to main shaft 502. Stripper cam 339 actuates a stripper microswitch 341 which is suitably supported on the adjacent structural framework 56 of the machine. A follower switch arm 340 of microswitch 341 bears against stripper cam 339 to complete the electrical circuit and actuate the stripper solenoid 342, also mounted on the adjacent structural framework 56 of the machine. A stripper support 345 is secured at its lower end to deck plate 401 of the aligning station 400 above solenoid 342 and carries a laterally projecting pivot pin 349 at its upper end. An arm 346 is pivotally mounted on pin 349 and is connected by a hinged connection at one end to rod 344 which in turn is interconnected by a hinged connector to the armature 343 of solenoid 342. A curved finger 347, attached to and extending inwardly above arm 346, pivots about pin 349 when the solenoid 342 is actuated and armature 343 retracted. Finger 347 rotates clockwise, when viewed from the front of the machine, and finger tip 348 swings to a position over the transferred insole 10 when the latter is being held by toe and heel transfer arms 70 and 72 coming to rest at a point intermediate the arms approximately on the transverse centerline thereof. As the transfer arms 70 and 72 are retracted clockwise about shaft 320 back into slots 321 and 322, the insole is brought into contact with the finger 347 and is stripped from transfer arms 70 and 72 permitting the insole to fall onto the bottom surface 22 of the last. Insole 10, with its last contacting surface 11 bearing tape 30, is now supported by the related bottom surface 22 of the last in a generally superimposed corresponding heel to heel and toe to toe relationship, in the manner shown in FIGURE 9. After the transfer arms 70 and 72 have been fully retracted into the slots 321 and 322, the operator loads another insole in the applying station 100 in the manner hereinbefore described and initiates another taping cycle. Cam 339 then actuates microswitch 341 to open the electrical circuit deactivating solenoid 343 and spring 350, connected between support 345 and rod 344 returns finger 347 and its related mechanism to an open remote position.

ALIGNMENT OF INSOLE AND LAST

Heel Rest Assembly

The aligning station 400 of the apparatus illustrated in FIGURES 2 and 12 comprises a stationary platform or deck plate 401 supported by the structural framework 56 that contains a longitudinally extending slot 403 within which the heel rest assembly 82 is slidably mounted and may be moved longitudinally to make any required adjustments. The heel rest assembly 82, as illustrated in FIGURES 2, 12, 16 and 34, includes a supporting adapter plate 410 detachably mounted on a pedestal 411. The heel rest assembly 82 is adjustable as to its longitudinal position along the heel rest slot 403 as well as being independently adjustable as to vertical height above the deck plate 401 by means of the conventional threaded section pedestal support 411 and related locking disks.

The heel rest supporting plate 410 contains an upstanding pin 412 and two upstanding last guide projections or shoulders 413 and 414. The operator inserts the heel rest adapter plate corresponding to the type of last being used. For example, if a conventional type men's last is being used, the operator would insert an adapter plate 410 having a pin 412 positioned to receive that type of last, which pin would correspond in diameter to the last thimble. If the last had a data or information plate secured to the top of the heel cone of the last, the thickness of adapter plate 410 would be less to compensate for the thickness of the data plate. If women's lasts were being used, the operator would select a compatible heel rest adapter plate. Thus, the supporting adapter plate 410 is selected to correspond with the type of last being used in order to insure that the last loaded onto the heel rest assembly 82 will be positioned so that the insole supporting bottom surface 22 of any last 20 will be elevated at approximately the same height above deck plate 401 and positioned at approximately the same predetermined longitudinal relation with respect to the heel rest assembly 82. Accordingly, the adapter plate will serve to uniformally position the insole supporting bottom portion of any type of last within the working area of the aligning station.

Last Elevating Assembly

Figure 34:
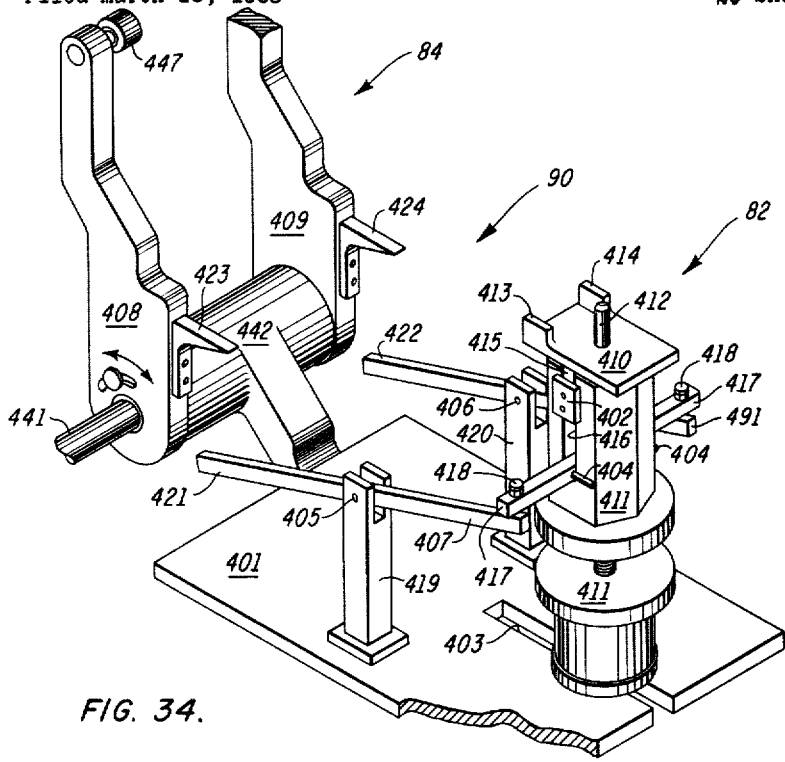
FIGURE 34 is a partial perspective view, with parts removed, showing the heel rest and last elevating assemblies.

As illustrated in FIGURES 12, 16 and 34, a last elevating assembly 90 is located intermediate the toe alignment assembly 84 and the heel alignment assembly 86 in the aligning station 400 of the machine. Each heel rest adapter plate 410 has a downwardly extending member 415 which is slidably mounted within a vertical slot 416 formed in the upper section of the heel rest pedestal 411 and guided at each side of the pedestal by guide flanges 402. The slot 416 extends laterally through the top of pedestal 411. A lifting bar 417 extends through slot 416 below the lower end of the downward extending member 415 of plate 410 and is maintained in lateral relation to slot 416 by pins 404. The lifting bar 417 extends laterally beyond each side of the pedestal 411 and is provided with adjustment screws 418 which project downwardly from each end. Mounted on deck plate 401 intermediate the heel rest assembly 82 and the left and right toe alignment arms 408 and 409 are upstanding supports 419 and 420. Levers 421 and 422 are mounted at the top of supports 419 and 420 by pivot pins 405 and 406. Forward ends 407 and 491 of levers 421 and 422 terminate under the adjustment screws 418 at each end of lifting bar 417, as illustrated in FIGURE 34.

As toe alignment arms 408 and 409 rotate on shaft 441, the toe alignment tip assemblies 461 and 462 close against the toe portion 25 of the last, as hereinafter described. If the last is a size 12, it will be longer than a size 6 last and the upper curved shoulder 24 of the size 12 last will be at a higher elevation above the supporting plate 410 than a size 6 last. As the arms 408 and 409 rotate, left finger 423 and right finger 424 bear downwardly to contact the ends of levers 421 and 422. The shorter the last, the greater the arcuate movement of arms 408 and 409 which rotate until the alignment tip assemblies 461 and 462 close against the toe of the last. Fingers 423 and 424 press downwardly on levers 421 and 422, pivoting ends 407 and 491 upwardly lifting bar 417 as well as plate support 415 to elevate adapter plate 410 upwardly. Proportioning the mechanism and the use of the adjusting screws will provide an elevation of the supporting plate 410, as well as last 20 mounted thereon, so that the last bottom 22, regardless of its size will be at substantially the same elevation above the deck plate 401 during the alignment operation.

Heel Alignment Assembly

Figure 35:
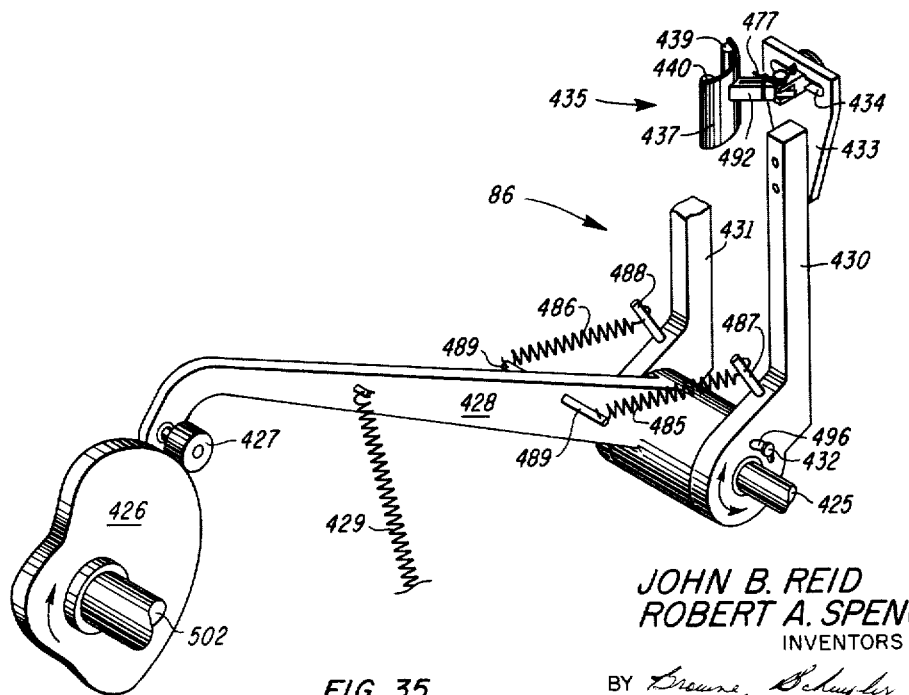
FIGURE 35 is a partial perspective view, with parts removed, showing a portion of the heel alignment assembly and related actuating components.
Figure 38:
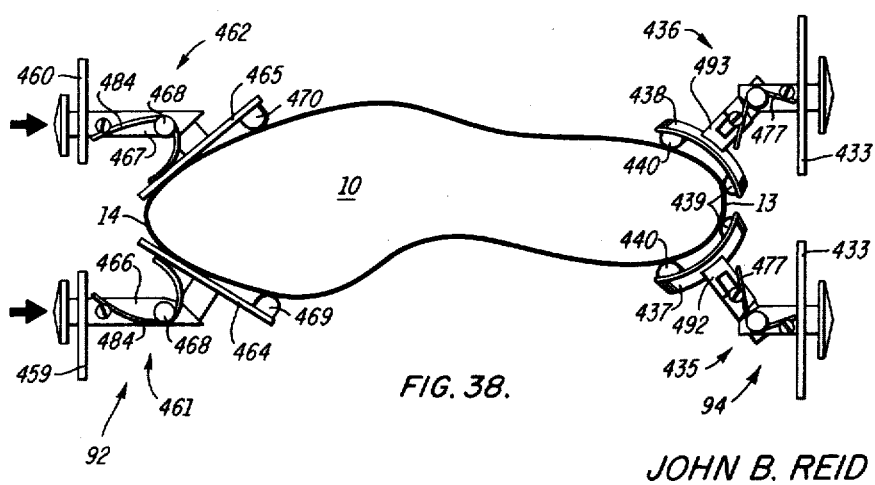
FIGURE 38 is a schematic illustration similar to FIGURE 37 showing the position of the toe alignment assembly after the toe portion of the insole has been deflected into aligned relation with the last toe and the assembled components displaced to a position of final alignment.

Referring to FIGURE 1, a heel alignment assembly 86 is located in the forward part of the alignment station 400. As illustrated in FIGURE 35, heel alignment cam 426 is mounted on main shaft 502 abutting against cam roll follower 427 mounted at the end of follower arm 428. Follower arm 428 is mounted on a heel alignment pivot shaft 425 which is supported by the structural framework 56 of the machine. Follower arm 428 is biased downwardly by spring 429 connected to the structural framework 56 adjacent each side of follower arm 428. Also mounted on pivot shaft 425 are heel alignment arms 430 and 431, rotatably secured by pins 432 in arcuate slots 496 formed in each arm. Arms 430 and 431 are biased in a counterclockwise direction about shaft 425 towards the follower arm 428 by springs 485 and 486 extending between the heel alignment arm spring pins 487 and 488 and the follower arm spring pin 489. On the top of arms 430 and 431 are fixed but adjustably mounting plates 433 containing horizontal slots 434 and vertical slots 490, as shown in FIGURE 11. Heel alignment tip assemblies 435 and 436 are mounted, as illustrated in FIGURES 11 and 35, through horizontal slots 434 formed in mounting plates 433. The vertical slots 490 and horizontal slots 434, formed in mounting plates 433, provide a range of adjustment vertically and laterally of the alignment tip assemblies 435 and 436. With reference to FIGURE 38, the alignment tips 435 and 436 comprise curved plates 437 and 438 mounted on double swiveled extension bars 492 and 493 which are adjustably supported in slots 434. The tip curved plates 437 and 438 each have two fixed but adjustably mounted contact bars 439 and 440 extending vertically along the inner face thereof.

Toe Alignment Assembly

The toe alignment assembly 84 illustrated in FIGURES 1, 12, 38 and 41, generally includes two alignment arms 408 and 409 separated by toe alignment follower arm 442 mounted on pivot shaft 441 which is supported by the structural framework 56. Arms 408 and 409 are each rotatably secured to opposite ends of follower arm 442 by retainer pins 494 mounted in arm 442 and passing through arcuate slots 495 formed in arms 408 and 409. Intermediate the ends of arm 442, is a cam roll follower 443 mounted on arm 442 which abuts against the toe alignment cam 444 mounted on main shaft 502, as illustrated in FIGURE 41. Cam follower 443 carried by arm 442 is biased by spring 445 into contact with toe alignment cam 444. Mounted laterally at the top of arms 408 and 409 and facing inwardly towards each other are cam roll followers 447 and 448 (FIGURES 34 and 41). Cam roll followers 447 and 448 are each disposed between two fixed but adjustable upstanding pins 449 and 450 mounted in alignment bars 451 and 452 in a longitudinally adjustable manner along each bar. Bars 451 and 452 are slidably supported and guided longitudinally by the rectangular slots 453 formed in the structural framework 56. Mounted intermediate the front and rear guide slots 453 near each end of bars 451 and 452 is a cross bar 454 supported by swivel eyes 455 and 456 mounted vertically on the top surfaces of bars 451 and 452. On the forward end of alignment bars 451 and 452 are left and right bar end plates 457 on which are fixed but adjustably mounting plates 459 and 460 (FIGURE 38). Each mounting plate contains a lateral slot 463 in which are mounted in a fixed but adjustable manner the left and right toe alignment tip assemblies 461 and 462, as illustrated in FIGURES 12, 38, and 41. Tips 461 and 462 include vertically mounted rectangular flat plates 464 and 465 carried by bars 466 and 467, respectively. Each tip bar contains a horizontal swivel joint 468 intermediate the mounting plates 459 and 460 and the tip plates 464 and 465 which permit each tip plate to rotate about the vertical pin carried by swivel 468. Mounted on the converging outer end portion of each tip plate 464 and 465, are vertically extending contact bars 469 and 470.

Figure 36:
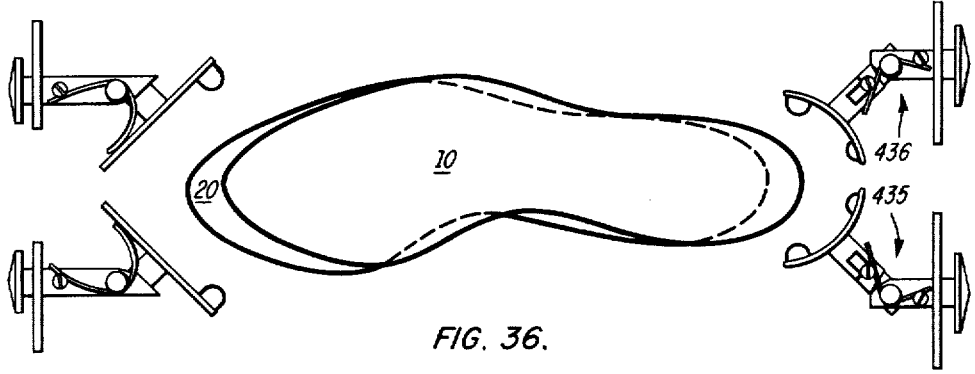
FIGURE 36 is a schematic plan illustration of a contoured insole and related last shown in generally corresponding overlapping relation prior to alignment.
Figure 37:
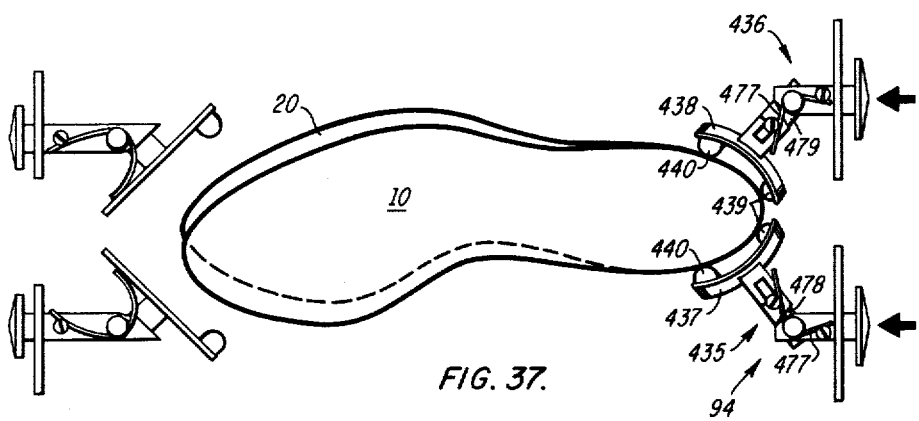
FIGURE 37 is a schematic illustration similar to FIGURE 36 showing the position of the heel alignment assembly after the heel portion of the insole has been deflected into substantial alignment with the heel portion of the last bottom.

In FIGURE 41, bars 451 and 452 are biased longitudinally toward the forward part of the machine by alignment bar springs 471 and 472 suitably attached to bars 451 and 452 at a point forward of the crossbar swivels 455 and 456 and to the structural framework of the machine intermediate the cross bar 454 and tip assemblies 461 and 462. The left and right tip plates 464 and 465 on tip bars 466 and 467, are spring biased, as illustrated in FIGURES 36 to 38, so that the included angle between tip plate 464 and tip plate 465 in the open position is approximately 100° when the tip assemblies 461 and 462 are in the open remote position shown in FIGURE 36. The plates 464 and 465 may be swiveled towards each other about swivel pins 468, until the included angle between plates 464 and 465 is decreased to a total included angle of approximately 45° when the tip assemblies 461 and 462 are in the closed position, as illustrated in FIGURE 38. Of course, it should be understood that the foregoing is merely exemplatory as it is possible to readjust these elements to facilitate any last contour. As the toe alignment arms 408 and 409 are actuated toward the toe 25 of the last, cam roll followers 447 and 448, disposed laterally between pins 449 and 450 which are fixed but adjustably mounted in bars 451 and 452, press against the forward pins on each bar and allow bars 451 and 452 to be urged longitudinally forward by springs 471 and 472 until the toe tip alignment assemblies 461 and 462 come to rest against the toe of the last. By moving pins 449 and 450, located on alignment bars 451 and 452, longitudinally toward the rear of the apparatus into selected adjustment holes provided in each bar, as illustrated in FIGURE 41, a wide range of adaptability is provided to handle the alignment and combining of short lasts and insoles, such as employed in the manufacture of children's footwear, since the toe alignment tip assemblies 461 and 462 will be advanced longitudinally closer to the heel rest and heel alignment assemblies 82 and 86, respectively, in relation to the size of the last and insole.

To compensate for the variation in forward travel of each bar 451 and 452, due to different configurations of each side of the toe of the last, each arm 408 and 409 may independently rotate angularly more or less about pivot shaft 441, as required, by means of the arcuate slots 495 formed in the hub portion of each arm 408 and 409 which provide freedom of movement of the arms with respect to the retaining pins 494 passing through each slot 495. As cam 444 actuates the related follower 443 carried on arm 442 to move the toe alignment assembly away from the toe of the last, pins 494 secured to the hub of arm 442 rotate about pivot shaft 441 until they contact the extremities of the arcuate slots 495 formed in arms 408 and 409 causing the arms to rotate about shaft 441 away from the last. Followers 447 and 448 press against the rear pins 449 mounted on rods 451 and 452 forcing the rods longitudinally backward and causing the toe alignment tip assemblies 461 and 462 attached to rods 451 and 452 to open away from the toe 25 of the last.

ALIGNMENT OF INSOLE WITH LAST

Although the method of positioning a left foot insole and related last is schematically illustrated in FIGURES 36 to 38, it should be understood that a right foot insole and related last, as schematically illustrated in FIGURES 39 and 40 may also be similarly positioned and aligned by the same apparatus of this invention without requiring any modification or adjustment of equipment.

*Positioning of Insole and Last Heel Portions*

Referring now to FIGURES 10, 12 and 35, after the insole 10 and related last 20 have been generally assembled in superimposed relation in the alignment station 400 of the machine, the main shaft 502 rotates cam 426 to actuate follower 427 and its related linkage, pivoting arms 430 and 431 counterclockwise about pivot shaft 425. As shown in FIGURE 37, the left and right heel alignment tip assemblies 435 and 436 move from a remote open position to an aligning position whereby the contact bars 439 and 440, mounted on curved plates 437 and 438 and carried by arms 430 and 431, respectively, bear against the heel portion 23 of the last 20 deflecting any overlapping portion of the insole projecting beyond the upper curved shoulder 24 of the last heel transversely and longitudinally forward to a substantially aligned position over the last through the swivel action of the left and right heel alignment tip assemblies 435 and 436 until each of the contact bars 439 and 440 reach a position substantially tangential to the rear portion of the last heel 23, indicated at points 473, 474, 475, and 476. Each contact bar 439 and 440 mounted on plates 437 and 438 is continuously biased by related springs 477, 485, 486 and 429 (shown in FIGURES 35 and 37) to prevent and retain the contact bars 439 and 440 on each tip assembly 435 and 436 in position to contact the heel of the last. The swivel members 478 and 479 of tip assemblies 435 and 436 afford a universal movement both up and down and to either side of each assembly causing the contact bars 439 and 440 of tip assemblies 435 and 436 to assume tangential positions previously described and as illustrated in FIGURES 10 and 37 to 40.

*Positioning of Insole and Last Toe Portions*

After the left and right heel alignment tip assemblies 435 and 436 have moved into aligning position with contact bars 439 and 440 in tangential contact with the rear portion of the last heel 23, the toe alignment assembly 84 moves longitudinally from a remote position to an aligning position, as illustrated in FIGURES 11, 12, 38 and 39, whereby the flat tip plates 464 and 465, bearing tip bars 466 and 467, respectively, are spring biased to bear against the toe portion 25 of the last 20 deflecting any overlap portion of the insole 10 projecting beyond the forward curve shoulder 26 of the last transversely and longitudinally toward the heel alignment assembly 86 to a substantially aligned position over the last through action of the swivels 468 in the left and right tip bars 466 and 467 until each tip plate and its contact bar reaches a position substantially tangential to the curved shoulder 26 of the last toe portion 25, indicated at points 480, 481, 482 and 483, as illustrated in FIGURE 39. The toe alignment assembly 84 with its left and right tip plates 464 and 465 are also provided with hinged joints to permit pivotal movement in a lateral direction which are located intermediate the ends of the left and right tip bars 466 and 467 permitting the tip plates 464 and 465 and their attached contact bars 469 and 470, respectively, to assume the tangential positions previously described. Each tip plate 464 and 465 and its contact bars 469 and 470, respectively, are similarly biased by related springs 484 to present and retain the planar face of the tip plates 464 and 465 and their related contact bars 469 and 470 in position to contact the toe portion 25 of the last as it approaches the aligning position. The insole 10 is free to shift with respect to the bottom of the last 22 as an adhesive bond has not been developed between the double-faced, pressure sensitive adhesive tape 30 and bottom portion 22 of the last to restrict transverse or longitudinal movement of the insole.

FINAL ALIGNMENT

Since the corresponding outlines of the contoured insole and related bottom portion of a last are customarily congruently contoured, when an insole is positioned and aligned with a related last, the contoured outlines of both the last and the insole will substantially coincide as their respective peripheral edges are aligned.

Toe alignment tip plates 464 and 465 and contact bars 469 and 470 as well as heel alignment contact bars 439 and 440 mounted on the left and right tip plates 437 and 438 will each bear against the last 20 and the insole 10 at a related common point, namely the tangent points 480, 481, 482 and 483 adjacent the toe portion 25 of the last and tangent points 473, 474, 475 and 476 adjacent the heel portion 23 of the last. Each of the plates 464 and 465 and the contact bars 469 and 470, as well as contact bars 439 and 440 on the left and right tip plates 437 and 438, is biased against either the last or the insole, exerting sufficient pressure in the direction of the related tangential points 473, 474, 475, 476, 480, 481, 482 or 483 to mutually cooperate with each other through the action of hinged joints in bars 466 and 467 at the toe and universal swivel joints 492 and 493 at the heel, to deflect any overlapping portion of the insole until each plate 464 and 465 and each of the contact bars simultaneously contact both the insole and the last. Since the tangent points at the heel and toe of the insole and last are common and since the contoured outline of the insole is made substantially congruent to the outline of its related last, the eight points of alignment, being identical corresponding congruent points on both the insole and the last, are brought downwardly one over the other into aligned substantially coinciding relation with each other. Thus, exact alignment and positioning are obtained. While in the disclosed embodiment, more than the three minimum corresponding points are utilized, the additional number of points of coincidence in excess of three serve to smoothly urge the insole into alignment with the last bottom by their spacial separation and disposition along the opposed peripheral contoured edges of the insole and related last. In addition, the cooperative action obtained at the eight points of alignment will compensate for the practical variations in lasts and insole shapes and complementary contours encountered in the trade.

If the insole is flexible or limp due to its construction, it will immediately conform to the profile of the last bottom when displaced to a position of final alignment with the last. However, if the insole is of a stiffer construction, the toe portion 14 and possibly the shank portion may remain vertically separated from the last bottom 22 without affecting the aligned relationship.

COMBINING OPERATION

While specific reference will be made hereinafter to the utilization of double-faced, pressure-sensitive adhesive tape to detachably secure an insole to a related last, it should be understood that the foregoing aligning apparatus is not limited in any way to the type of securing means employed since it is possible to utilize conventional tack fasteners, or the like, to combine the components into an assembled unit after they have been precisely positioned in aligned relation by the disclosed apparatus.

Referring now to FIGURES 2 and 12, at the time the toe alignment assembly 84 and the heel alignment assembly 86 are in retracted open position, the combining roller assembly 98 is raised and retracted. When the angle of the main shaft index has reached approximately 0°, the heel alignment assembly 86 starts to close against the superimposed taped insole 10 and last 20, and at approximately 335°, the toe alignment assembly 84 begins to close, as schematically shown in FIGURE 29. The toe tip plates 464 and 465 and related contact bars 469 and 470 as well as the heel contact bars 439 and 440 mounted on the left and right tip plates 437 and 438 mutually cooperate with each other to position the previously taped insole 10 in aligned relation over the last 20. As the toe alignment arms 408 and 409 are actuated towards the toe of the last, the related left and right alignment bars 451 and 452 move longitudinally forward until the contacting members of the toe alignment assembly 84 have come to rest contacting the insole and last, as hereinbefore described. As the alignment bars 451 and 452 move longitudinally forward, crossbar 454 is moved forward contacting and displacing boom support arm 602 in a longitudinally forward direction, as illustrated in FIGURES 12 and 13. Shaft 603, supported by the structural framework 56 of the apparatus, serves as a pivot for boom support arm 602 which in turn is pivotally connected by pin 604 to boom 605. Boom power arm 606 is also mounted at its lower extremity on shaft 603 adjacent to arm 602. Arm 606 has at its upper end a laterally projecting rectangular collar or enclosure 607, through the opening of which arm 602 passes. Pin 609 connects arm 606 to bar 608 between shaft 603 and collar 607. Bar 608 in turn is connected to arm 610 by pin 611. Follower arm 610 in turn pivots on shaft 157. Cam roller follower 612 is mounted on follower arm 610 and is spring biased in abutting relation against cam 613 which is mounted on main shaft 502, as illustrated in FIGURES 12 and 24. Spring 614 is connected at one end to the structural framework 56 and at its other end to the forward end of collar 607, biasing boom power arm 606 and its related linkage 608, 610 and follower 612 which abuts against cam 613. When power arm 606 is in remote retracted position, the opening 615 in collar 607 provides free movement of support arm 602 in a longitudinally forward direction when actuated by cross bar 454.

The combining roller assembly 98 is mounted on the forward end of boom 605. Combining roller 616 is suspended from boom 605 by bracket support 617. Boom 605 is slidably supported by boom guide assembly 95 (FIGURE 1) mounted on rocking arms 618 and 619. Boom 605 is moved longitudinally toward the heel portion of the last 20 by spring 614 which urges arm 602 forwardly. The combining roller 616 is mounted on combining roller axles 620 between a pair of swivels 621 located at each end of the axle, which are biased by springs 622. The roller 616 will travel across the top of the insole, regardless of the surface contour or profile, and exert a pressure substantially normal to the area of contact with the insole developing an adhesive bond between the taped insole and last to combine the aligned components into a unitary assembled structure.

As illustrated in FIGURES 12 and 13, cam 601 is mounted on the left end of main shaft 502. Cam roll follower 623, mounted at one end of follower arm 624, is maintained by the weight of the rocker arms 618 and 619, and their related linkages, in abutting position against cam 601. Follower arm 624 is pivotally mounted on shaft 625 which in turn is supported by the structural framework 56 of the machine. Follower arm 624 is pivotally connected at the opposite upper end by pin 626 to arm 627 which in turn is pivotally interconnected with rocking arm 618 by pin 628 located intermediate the ends thereof. Rocking arms 618 and 619 are pivotally mounted at their lower ends by shaft 629 which is supported by the structural framework 56 of the machine.

As cross bar 454 is moved longitudinally forward by the left and right alignment bars 451 and 452, it will contact and then displace longitudinally forward arm 602 and associated boom 605 by an amount related to the size of the last, so that when the combining roll assembly 98 is actuated from a remote raised position and moves downwardly toward the toe 14 of the insole, the combining roll assembly 98 will be positioned just forward of and clear the related members of the toe alignment assembly 84, as shown in FIGURE 13.

Figure 14:
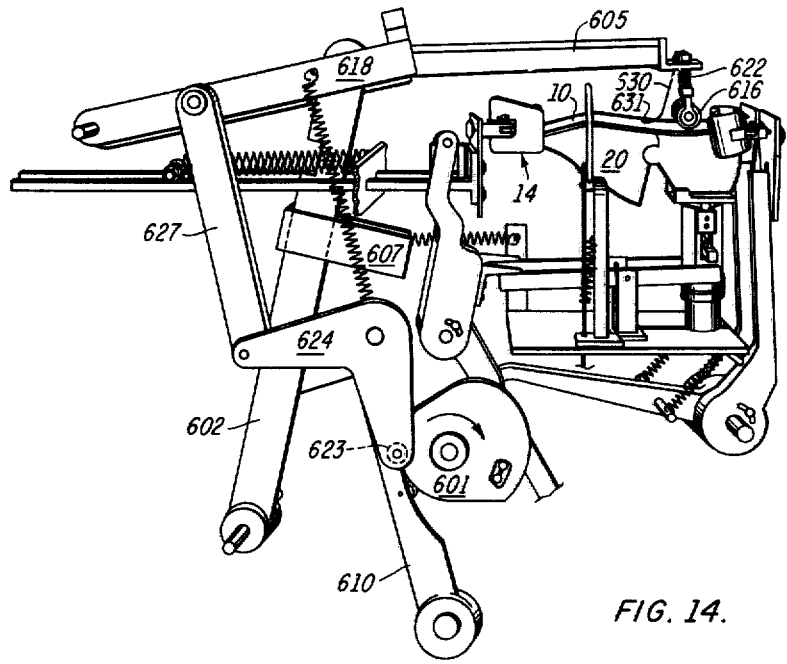
FIGURE 14 is a partial perspective view similar to FIGURE 12, with parts removed, showing the position of the actuating components near the completion of the combining operation.

When the main shaft index 510 reaches an indication of approximately 335°, cam 613 and its related mechanisms for oscillating boom power arm 606, maintains the boom power arm 606 in the remote rearward position while the relative position of combining roller assembly 98 is longitudinally preadjusted to the length of the last. When the main shaft index 510 indicates approximately 335°, cam 601 actuates its related mechanism to cause the combining roller assembly 98 to move downwardly toward the toe end 25 of the last until the combining roller 616 is approximately 2 inches above the insole. This action occurs simultaneously as the combining roll assembly 98 is moved longitudinally forward to a predetermined amount so as to clear the toe alignment assembly 84 as previously described. When the main shaft index reaches an indication of approximately 305°, cam 601 actuates its related mechanisms to cause the combining roll assembly 98 to drop until it contacts and presses downwardly against the insole 10, as illustrated in FIGURE 13. A spring finger 630 located longitudinally to the rear of combining roll 616 and projecting downwardly and rearwardly, contacts and presses against the toe end 14 of the insole just before the insole is contacted by the combining roll 616. While the insole is being retained in aligned position by the toe and heel alignment assemblies 84 and 86, the toe 14 of the insole is deflected downwardly until it contacts the toe portion 25 of the last 20 by the curved end 631 of finger 630 which causes the lower extremity of finger 630 to be deflected rearwardly off the insole and last. Combining roll assembly 98 now having made contact with insole 10 and being supported in turn by the assembled and aligned insole 10 and last 20, is actuated by cam 613 and its related mechanisms to move longitudinally forward while the combining roll assembly 98, boom 605 and related rocking arms 618 and 619 are biased downwardly by spring 632, as illustrated in FIGURES 13 and 14. The combining roller assembly 98 contacts the toe portion 14 of the insole, pressing the toe portion downwardly against the last 20 and applying pressure due to the combined weight of the mechanism and biasing tension provided by the loading spring 632. The insole 10, if separated from the last 20 due to characteristics of stiffness, is forced downwardly by the combining roller 616 while being retained in aligned relation through the cooperative guiding action of the toe and heel alignment assemblies 84 and 86 until directly contacting the bottom portion 22 of the last whereupon the interposed tape 30 will be pressed into direct contact with the opposed faces of the aligned components to develop a pressure-sensitive adhesive bond.

Cam 613 and its related mechanisms then move combining roller assembly 98, boom 605 and related arm 602 in a longitudinally forward direction as collar 607 of arm 606 contacts the rear edge of boom support arm 602. Combining roller 616, mounted on boom 605, is slidably supported by the boom guide assembly 95 and is moved longitudinally toward the heel portion 23 of the last by the action of cams 601 and 613 and their related mechanisms as earlier described. Combining roller 616, mounted on swiveled axle 620 and biased downwardly at each end by springs 622, will roll across the top of the insole regardless of surface contour or profile and exert a pressure substantially normal to the area of contact with the insole, developing an adhesive bond between the taped insole 10 and last 20 to combine the aligned components into a detachably assembled unit.

Figure 15:
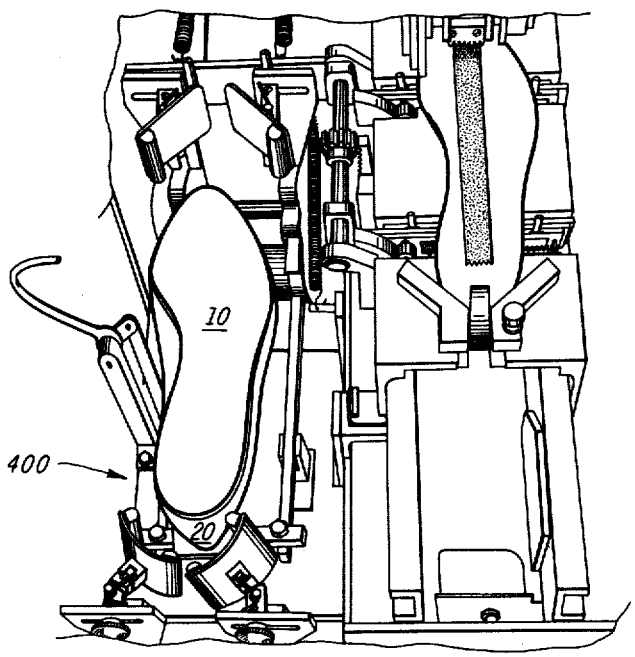
FIGURE 15 is a partial perspective view of the aligning station showing the assembled last and insole combined in aligned relation prior to removal by the operator.

When the combining roller 616 has reached a point near the heel end 13 of the insole, the combining roller 616 will then move upwardly. The lifting action will begin when the main shaft index 510 indicates approximately 198°. The combining roller assembly 98 and boom 605 continue to lift upwardly from between 198° and 157° indication of the main shaft index 510, and then, actuated by cam 613 and its related mechanisms, boom 605 and combining roll assembly 98 are retracted toward the rear of the machine while remaining in the upward remote position, as illustrated in FIGURE 12. At approximately 180° and 175° of the main shaft index, toe alignment assembly 84 and heel alignment assembly 86, respectively, begin to open with the heel alignment assembly becoming fully open at about 155° while the toe alignment assembly moves to fully opened position when the index 510 indicates approximately 147°. When the index 510 indicates approximately 145°, as illustrated in FIGURES 15 and 16, the operator unloads the aligned and combined insole and last assembly from the machine and loads another last into the aligning station 400.

The apparatus is so designed that by varying the speed of the driving means, the entire cycle of operation of the machine can be proportionately varied to either increase or decrease the duration or length of the operating cycle, in order to accommodate an operator's skill. Moreover, this machine has been designed to automatically perform the foregoing operations on all types of footwear which require an insole in their construction and are made on a last, including men's, women's children's and infants' shoes, slippers, moccasins, boots, and the like, of any size or type, either right or left foot regardless of contour or shape. A variety of adjustments are provided to enable the machine to handle this wide range of work under optimum conditions. For example, the machine is so designed that it is capable of handling all lengths and widths of lasts of varying configurations and shape as well as all types of contoured insoles including those which are of ribbed, channeled, laminated or preformed construction.

Notwithstanding the complete universal adaptation of the machine for performing the required operations previously specified, it can be easily operated by any unskilled person since the operator is merely required to make any adjustments necessary to perform the desired operation, initiate the sequence of operation, load the related insoles and lasts, and finally unload the combined insole and last assembly.

ALTERNATE EMBODIMENTS

Tape Applying Apparatus

Figure 42:
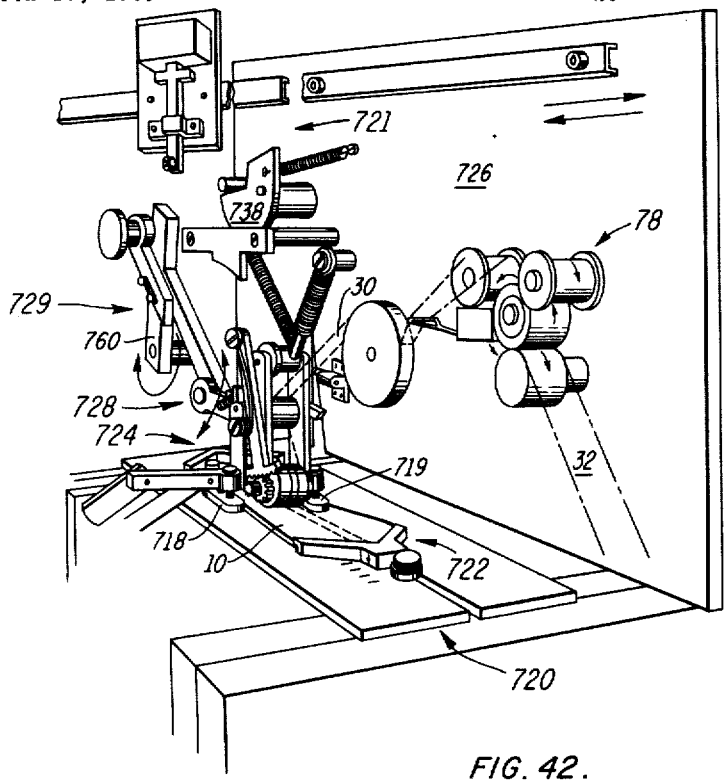
FIGURE 42 is a partial perspective view of a modified tape applying station constructed in accordance with the present invention showing movement of the tape applying assembly relative to a positioned insole to effect the transfer of tape.

Rather than moving an insole relative to the tape applying assembly to effect the transfer of tape during the applying sequence, it is possible to perform the converse operation by retaining the insole in stationary position while moving the tape applying assembly during the transfer step with the modified apparatus illustrated in FIGURE 42, the specific details of which are more fully disclosed in our previously referred to Patent No. 3,099,026, and are incorporated herein by reference. Referring now to the apparatus illustrated in FIGURE 42 as well as the operational sequence diagrammatically shown in FIGURE 43, this embodiment generally comprises a longitudinally slotted stationary table or deck portion 720 with slidably mounted heel and toe guides 722 and 724 that are adjustably mounted for positioning an insole 10 located below a movable carriage assembly 726 which supports a modified tape applying assembly 728 and interliner stripping assembly 78.

In loading this apparatus, an insole 10 is placed by the operator on deck portion 720 so that the insole will be located between the adjusted heel guide assembly 722 and the open, retracted, toe guide assembly 724 which, through suitable actuating mechanisms, not shown, is moved toward the heel guide assembly 722 into contact with the toe portion of the insole, deflecting the same into an aligned position on the deck for receiving a length of tape 30 within the common area, not shown, but as previously defined herein. After the insole has been so positioned, the left and right grips 718 and 719 are moved downwardly by related linkages, not shown, to retain the insole 10 in aligned position until completion of the tape transfer sequence.

In operation, double-faced, pressure-sensitive adhesive tape 30 is applied directly to the positioned insole 10 within the previously described common area by the tape applying assembly 728 after it has moved from a remote raised position downwardly toward the insole upon actuation of a trigger assembly 721 and related cam assemblies which are illustrated in FIGURE 42. After the tape applying assembly 728 contacts the positioned insole 10, the associated carriage assembly 726 is moved longitudinally forward through the action of the connecting rod assembly 729 and crank arm assembly 760, which in turn are driven through a suitable drive train by a related power source of conventional design, not shown. As the carriage assembly 726 advances longitudinally forward, the tape applying assembly 728 moves forward over the deck 720 a preselected distance transferring a length of tape 30 directly to the positioned insole 10 within the specified area. By varying the stroke of the crank arm assembly 760, the travel of the movable carriage and associated tape applying assemblies can be adjusted to control the length of tape that is actually applied to the insole, and by varying the length of the connecting rod assembly 729, the relative position of the strip of tape with respect to the insole may also be changed.

After a preselected length of tape has been transferred, the tape applying assembly 728 is raised by the connecting rod assembly 729, actuating the tape severing mechanism in the manner previously described to cut the tape. Thereafter the applying assembly 728 is returned to remote raised position and the tape severing mechanism recocked in essentially the same manner as previously described herein. While tape is being fed to the applying assembly 728, the interliner 32 is automatically stripped upon demand by the liner takeup assembly 78, the operation of which is also similar to that previously described.

Figure 43:
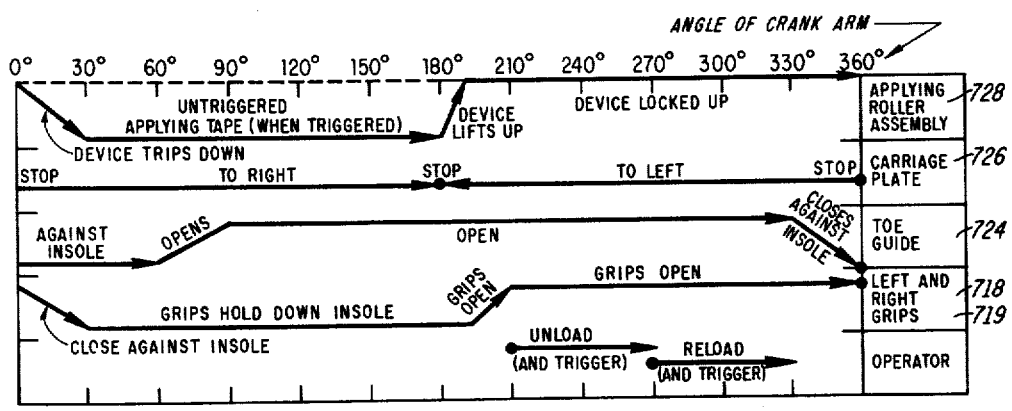
FIGURE 43 is a diagrammatic illustration of the sequence of operation of the modified applying station and related components shown in FIGURE 42.

The foregoing cycle of operation is performed in the sequence diagrammatically illustrated in FIGURE 43 through the utilization of associated actuating mechanisms, not shown, which are more specifically disclosed in our aforementioned application.

Of course, it is possible to simultaneously move the positioned insole and tape applying assembly relative to each other in order to effect the desired transfer of tape during the applying cycle by utilizing the movable deck assembly 40 illustrated in FIGURE 1, in association with the tape applying assembly 728 and related movable carriage 726, illustrated in FIGURE 42, by merely rearranging the associated actuating mechanisms in compatible relationship. By way of further modification, the tape applying assembly may be arranged to sever the tape at a preselected length either prior, during or subsequent to the actual tape transferring sequence as well as to apply a plurality of tape increments to an insole during each transfer cycle.

Alignment Apparatus

Figure 44:
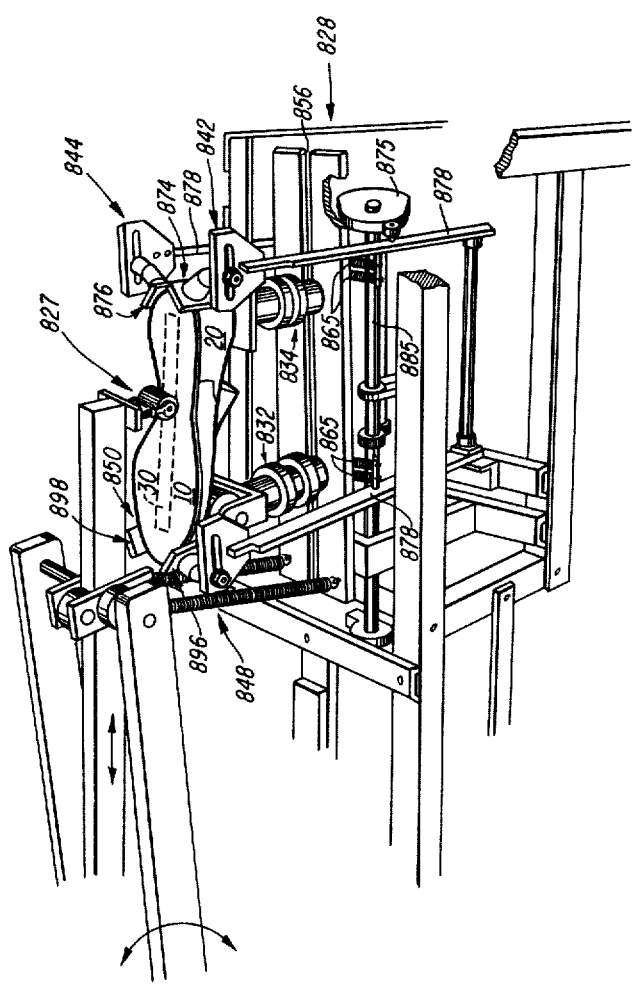
FIGURE 44 is a partial perspective view of a modified aligning and combining section constructed in accordance with the present invention showing an arrangement where the related guide assemblies move transversely toward each other to align and combine a contoured insole with a related last.
Figure 45:
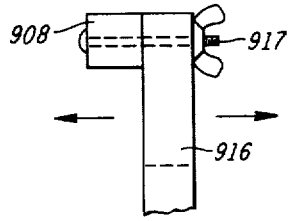
FIGURE 45 is a partial schematic side view illustrating a guide assembly support and direction of movement of the modified guide system illustrated in FIGURE 46.
Figure 46:
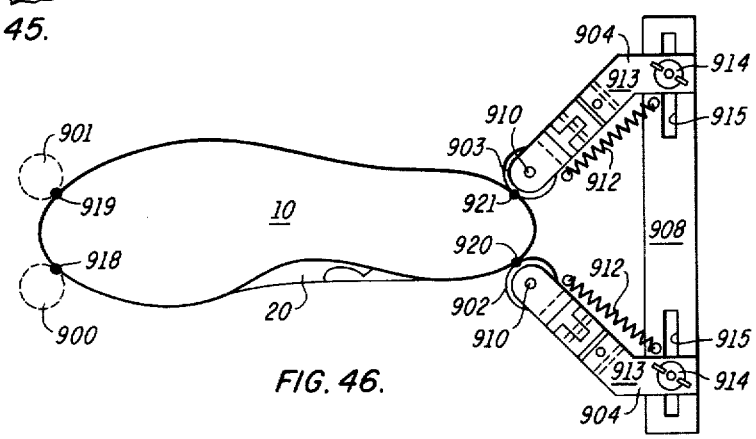
FIGURE 46 is a schematic plan view of a modified guide system constructed in accordance with the present invention.
Figure 47:
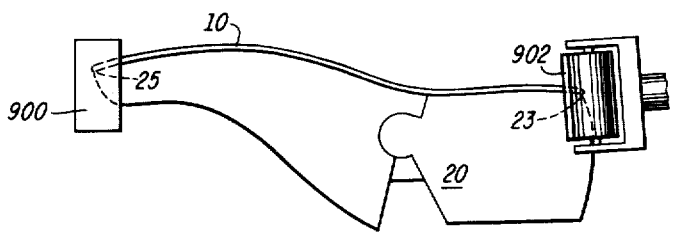
FIGURE 47 is a partial schematic side view of the modified guide system illustrated in FIGURE 46.
Figure 48:
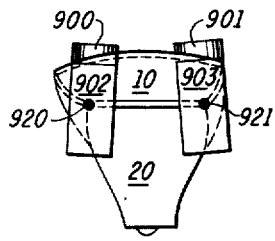
FIGURE 48 is a partial perspective schematic end view of the modified guide system illustrated in FIGURE 46.

While in the disclosed embodiment, the alignment assemblies move in a longitudinal direction, parallel to the center line of the last, it should be understood that as an alternate arrangement, the alignment assemblies may be modified to move transversely in the manner illustrated in FIGURE 44 without changing the principle of alignment.

With reference to the modified apparatus shown in FIGURE 44, the toe and heel aligning arms 878 are arranged to move in a direction substantially transverse to the longitudinal centerline of the superimposed insole and last during the aligning sequence to achieve final alignment rather than longitudinally toward each other in the manner previously described. The illustrative embodiment illustrated in FIGURE 44 is more specifically disclosed in our previously referred to Patent No. 3,092,861, which is incorporated herein by reference, and generally includes a horizontal deck portion 828 so arranged as to provide a longitudinally extending slot 856 within which toe and heel rest assemblies 832 and 834 are slidably mounted to make any required adjustments as to their longitudinal position along the deck slot as well as independent adjustment as to vertical position.

After a last 20 and related contoured insole 10 have been mounted on the toe and heel rest assemblies 832 and 834 in generally corresponding superimposed relation, heel guide assemblies 842 and 844 move transversely from a remote loading position into substantially aligned engagement with the heel portions of the insole and last in the manner previously described. Thereafter, the front toe guide assemblies 848 and 850 move transversely from a remote loading position into substantially aligned engagement with the related toe portions of the insole and last. Through the mutually cooperative action of the four swiveled planar guide tip plates 874, 876, 896 and 898, any overlapping portion will be deflected until the peripheral edges of insole 10 have been displaced to a position of final alignment on the bottom portion of last 20 when each guide tip plate has assumed the tangential relationship previously described. Transverse movement of the toe and heel guide assemblies is controlled through the transverse biasing action of springs 865 which pull guide assembly arms 878 and related cam followers against actuating cams 875 mounted on a main drive shaft 885 that in turn is driven through a suitable drive train by a related power source of conventional design, not shown.

After the contoured insole and last have been aligned, a combining roller assembly 827 moves from a raised retracted position downwardly against the insole and advances longitudinally forward toward the heel guides to develop an adhesive bond between the previously taped insole 10 and related last 20 while the guide assemblies are retained in aligned engaging position, similar to the operational sequence previously described in connection with the apparatus illustrated in FIGURE 1. Thereafter, the guide assemblies are retracted to remote position by actuating cams 875 in order to allow the detachably assembled unit to be withdrawn.

Without changing the principle of alignment, it is possible to vary the sequence of alignment merely by changing the timing relationship of the actuating cams in order to obtain the converse movement where the toe portion of the insole is initially aligned before the heel portion or to adjust the cams so that the toe and heel portions will be aligned simultaneously. Moreover, the sequence of alignment can also be varied in the foregoing manner to first align either the right or left side of the assembled insole and last and then the opposite side or both sides simultaneously by merely adjusting the timing relationship of the actuating cams also without affecting the principle of alignment.

Guide Systems

As shown in FIGURES 45 through 48, an alternate guide system may be employed to align a contoured insole 10 and related last 20 for subsequent combining into a detachably assembled unit. Although a left insole and last have been illustrated in these figures, it should be understood that a right insole and related mating last can also be similarly aligned by the same guide system. The last 20 is initially mounted in the manner previously described, either on the heel rest assembly 82 or toe and heel rest assemblies 832 and 834.

Two vertical roller guides 900 and 901 are disposed at the toe portion 25 of the last and two vertical roller guides 902 and 903 at the heel 23 of the last, each being respectively supported by a double swivel yoke arm 904. The related front guides 900 and 901, as well as heel guides 902 and 903, are adjustably mounted on a carrying bar 908, the details of which are omitted from the toe portion since they would be merely repetitive. The individual roller guides are free to rotate around pin 910 pivotally mounted in a yoke carried by each arm 904. Further, each yoke is biased inwardly by a tension spring 912 interconnected with the carrying bar 908. Each swivel arm has a downwardly projecting adjustment member 914 which slidably fits into a related slot 915 formed at opposed ends of the carrying bar 908. The adjustable member 914 is so designed that the roller guides 900—903 and their arms 904 may be laterally adjusted within the slots 915. In turn, the carrying arm 908 is adjustably mounted on a guide arm 916 by adjusting member 917 to permit vertical adjustment. The guide arm 916 oscillates in a longitudinal direction parallel to the center line of the last 20 during the aligning operation previously described in connection with FIGURE 1.

In operation, after the operator has mounted the last 20, either on the heel rest assembly 82 or an the toe and heel rests 832 and 834, and placed the previously taped insole 10 on the bottom portion 22 of the last, roller guides 900 and 901 move in a longitudinal direction toward the last 20 into tangential contact with the toe portion 25. Thereafter, the heel guides 902 and 903 move longitudinally toward the last 20 into tangential contact with the heel portion 23. The roller guides, acting in a similar manner to the front and rear guide tip assemblies 92 and 94, displace the insole relative to the last to a position of final alignment where the contoured peripheral edges of the insole coincide with the last at tangent points 918—921 since the double swivel action permits each roller to contact the insole and last at only one point. Tension springs 912 are provided to keep rollers 900—903 from misalignment when they initially contact the last 20 and insole 10 as well as to provide a lateral force for aligning the insole over the last. Thus the same principle of alignment is employed during operation of the alternate guide system.

However, it should be understood that the roller guides 901 and 903 can, in the alternative, be interconnected by a common carrying bar, not shown, which moves transversely from remote to aligning position simultaneously with roller guides 900 and 902 mounted on an imposed carrying bar. The transverse movement can be achieved in a manner similar to the related movement imparted to guide assemblies 842 and 844 or 848 and 850. Moreover, roller guides 900—903 may be substituted either for the heel contacting bars 439 and 440 or toe contacting bars 469 and 470 as well as for swivel tip plates 874, 876, 896 and 898, without modification, since the alignment procedure is identical.

Guide Tip Assemblies

Figure 49:
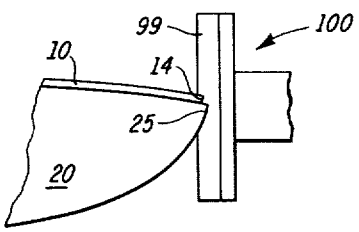
FIGURE 49 is a partial side elevational view schematically illustrating a modified resilient guide tip assembly constructed in accordance with the present invention.

When a shoe manufacturer utilizing this apparatus desires to align and combine a contoured insole to a related last where the insole is purposely cut shorter in length than its mating last, and is to be positioned in precise alignment with the heel of the last, a varying difference of approximately 1/16" between insole toe portion 14 and the last toe 25 exists, as shown in FIGURE 49, requiring modification of the guide tip assembly. A resilient layer, preferably of cellular foam rubber, is secured in any well known manner either to the working planar face of the front tip plates 464 and 465 or guide plates 896 and 898 so that in operation, the toe alignment guide assemblies 92 or 48 and 50 push the insole 10 over the last 20 and then continue aligning the insole with the last in the direction of the last heel portion 23 as the rubber layer 99 carried by the guide tip plate, generally indicated by the numeral 100, presses against the insole and last. The last 20, being incompressible, compresses a portion of the foam rubber layer 99 at the point of contact while the uncompressed portion continues to press against the shortened insole toe 14 moving the insole longitudinally toward the heel portion 23 of the last while aligning it properly with the last toe portion 25. Due to the resilient action of the rubber layer, the difference in length between the last and the insole at the toe end is compensated for. Resiliency of layer 99 can be varied to meet any required conditions. In addition, a similar resilient layer can be applied to the peripheral face of the roller guides 900 and 901 used in aligning the insole and last at the toe end.

It is to be understood that, although several preferred embodiments of this invention have been shown in the drawings and described with considerable particularity in the foregoing specification, the present invention is not limited to the specific details of construction, shown and described, but includes all modifications coming within the scope of the appended claims and their equivalents.

What is claimed is:

1. Apparatus for assembling an insole and related last of generally corresponding peripheral contour comprising in combination, a first section for applying adhesive material to said insole, a second section including means for aligning into congruent relation any overlapping peripheral portion of said insole relative to said last and combining said insole and last in superposed assembled relation, and a transfer section provided with means for conveying said insole from said first section to said second section upon completion of the applying sequence.

2. Apparatus of the type defined in claim 1, wherein said first section includes means for positioning said insole to receive and retain said adhesive material within an area defined by the common outline formed from superimposing upon a face of said insole an opposed image thereof, applying means for transferring said adhesive material directly to that portion of the positioned insole face disposed within said area, and means for moving one of the previously mentioned means relative to the other to effect the transfer of said adhesive material.

3. Apparatus of the type defined in claim 1, wherein said second section means is movable between a remote position and an aligning position to displace any overlapping peripheral portion, and means for moving said aligning means between said positions to effect the alignment of said insole and last.

4. Apparatus of the type defined in claim 3, wherein said second section additionally includes means for combining said insole to said last with said adhesive material while the same are retained in aligned relation to form a detachably assembled unit.

5. Apparatus of the type defined in claim 1, wherein said first and second sections are disposed in juxtaposed relation and said transfer section moves therebetween to convey said insole from said first section to said second section upon completion of the applying sequence.

6. Apparatus of the type defined in claim 5, wherein said transfer section additionally includes transferring means which moves between said first and second sections, and means for stripping said insole from said transferring means when the latter has moved to said second section.

7. In the manufacture of footwear, apparatus for applying adhesive material to an insole comprising, means for positioning said insole to receive and retain said adhesive material within an area defined by the common outline formed from superimposing upon a face of said insole a mirror image thereof, applying means for transferring said adhesive material directly to that portion of the positioned insole face disposed within said area, and means for moving one of the previously mentioned means relative to the other to effect the transfer of said adhesive material.

8. In the manufacture of footwear, apparatus for applying adhesive material in the form of a strip of tape to an insole comprising means for positioning said insole to receive and retain said tape within an area defined by the common outline formed from superimposing upon a face of said insole a mirror image thereof, applying means for transferring said tape directly to that portion of the positioned insole disposed within said area, means for moving one of the previously mentioned means relative to the other to effect the transfer of said tape, and severing means for cutting a preselected length of tape in direct relation to the extent of said area.

9. In the manufacture of footwear, apparatus of the type defined in claim 8, additionally including means for controlling the relative disposition of tape within said area.

10. In the manufacture of footwear, apparatus of the type defined in claim 8, wherein said tape is severed while being transferred to said insole.

11. In the manufacture of footwear, apparatus for applying double-faced, pressure-sensitive adhesive tape to an insole comprising, means for positioning said insole to receive and retain said tape within an area defined by the common outline formed from superimposing upon a face of said insole a mirror image thereof, applying means for transferring said tape to the positioned insole, said applying means being movable between a position remote from said insole to a tape applying position adjacent the positioned insole face disposed within said area, means for moving one of the previously mentioned means relative to the other while said applying means is in tape applying position to effect the transfer of said tape directly to the insole face within said area, and cutting means for severing said tape at a preselected length.

12. In the manufacture of footwear, apparatus of the type defined in claim 11, wherein said applying means is moved relative to the positioned insole to effect the transfer of said tape.

13. In the manufacture of footwear, apparatus of the type defined in claim 11, wherein the positioned insole is moved relative to said applying means to effect the transfer of said tape.

14. In the manufacture of footwear, apparatus of the type defined in claim 11, additionally including stripping means for removing an interliner from said tape and sensing means for detecting movement of said interliner in order to actuate said stripping means in response to the amount of tape being transferred.

15. Apparatus for removing a liner from a roll of tape comprising stripping means for removing said liner from said tape and sensing means for detecting the angular displacement of said liner relative to the peripheral surface of said roll during removal of tape therefrom in order to actuate said stripping means in response to the amount of tape being removed.

16. In the manufacture of footwear, an apparatus of the type defined in claim 15, wherein said roll of tape is mounted for rotary movement about a center axis, guide means for controlling the direction of movement of said liner from said roll disposed adjacent the intersection of two lines, one extending from the point of intersection to a point where said liner separates from said roll along the approaching periphery thereof and the other extending between said center axis and the point of intersection, said intersecting lines defining an included angle which forms a sensing range through which said liner passes in its movement towards said guiding means, stripping means for separating said liner from said roll and interconnected with said liner after the latter has contacted said guide means, and sensing means being disposed within said sensing range to intermittently actuate said stripping means in response to the movement of said liner passing through said sensing range.

17. In the manufacture of footwear, an apparatus of the type defined in claim 16, wherein said stripping means comprises a fixed idler spool and a motor driven roll spaced therefrom, and a movable jam roll located intermediate said spool and said driven roll and arranged to rotate in a direction opposite to that of said spool and said driven roll, said jam roll being movable between a remote idling position and an operative position adjacent said spool and driven roll, said driven roll being actuated by said sensing means upon movement of said liner within said sensing range to exert a tension on said liner which moves said jamming roll to operative position.

18. In the manufacture of footwear, apparatus of the type defined in claim 11, wherein said applying means includes an applying member having a surface of contact capable of developing an adhesive bond of reduced magnitude with one face of said tape as compared with the adhesive bond developed between the other face of said tape and said insole so that said tape may be directly transferred from said contacting surface to said insole.

19. In the manufacture of footwear, apparatus of the type defined in claim 18, wherein the contacting surface of said applying member serves to develop an adhesive bond with one face of said tape after the later has been severed so that said applying means may be subsequently returned to remote position without withdrawing said tape from the contacting surface of said applying member.

20. In the manufacture of footwear, apparatus for automatically aligning an insole and related last of generally corresponding peripheral contour comprising, aligning means movable between a remote position and an aligning position which includes insole and last contacting means arranged to displace any overlapping peripheral portion to a position of final alignment where the corresponding peripheral contours of said insole and last coincide in superposed aligned relation, and means for moving said aligning means between said positions to effect the alignment of said insole and last.

21. In the manufacture of footwear, apparatus of the type defined in claim 20, additionally including securing means for detachably combining said insole and last after the same have been positioned in aligned relation to form an assembled unit.

22. In the manufacture of footwear, apparatus of the type defined in claim 21, wherein said insole and last are retained in aligned relation by said aligning means until detachably combined into an assembled unit by said securing means.

23. In the manufacture of footwear, apparatus of the type defined in claim 20, wherein said aligning means includes heel and toe guid eassemblies which are movable between said positions into contact with the related peripheral portions of said insole and last.

24. In the manufacture of footwear, apparatus of the type defined in claim 23, wherein said heel and toe guide assemblies are sequentially moved from said remote position to said aligning position.

25. In the manufacture of footwear, apparatus of the type defined in claim 23, wherein said heel and toe guide assemblies are simultaneously moved from said remote position to said aligning position.

26. In the manufacture of footwear, apparatus of the type defined in claim 23, wherein said heel and toe guide assemblies are moved from said remote position to said aligning position in a direction substantially transverse to the longitudinal center-line of said last.

27. In the manufacture of footwear, apparatus of the type defined in claim 23, wherein said heel and toe guide assemblies are moved from said remote position to said aligning position in a direction substantially parallel to the longitudinal center-line of said last.

28. In the manufacture of footwear, apparatus of the type defined in claim 20, additionally including means for supporting said last to receive said insole, said supporting means being operative in response to the size of said last for positioning said insole and last in predetermined relation relative to said aligning means.

29. In the manufacture of footwear, apparatus for aligning the heel and toe portions of an insole with the corresponding insole supporting bottom portion of a related last comprising, last supporting means, aligning means for moving said insole relative to said last to displace any overlapping portion to an aligned position in which the contoured outlines of the heel and toe portions of said insole and last bottom coincide in superimposed relation, said aligning means including a heel guide assembly movable from a remote position to an aligning position in contact with the heel portion of said insole and last, and a toe guide assembly movable from a remote position to an aligning position in contact with the toe portion of said insole and last, and means for moving said heel and toe guide assemblies between said remote positions and aligning positions.

30. In the manufacture of footwear, apparatus for aligning the heel and toe portions of an insole with the corresponding insole supporting bottom portion of a related last comprising, last supporting means, aligning means for moving said insole relative to said last to displace any overlapping portion to an aligned position in which the contoured outlines of the heel and toe portions of said insole and last bottom coincide in superimposed relation, said aligning means including a heel guide assembly movable from a remote position to an aligning position in substantially tangential aligning contact with the heel portion of said last for deflecting the heel portion of said insole into substantial alignment therewith, and a toe guide assembly movable from a remote position to an aligning position in substantially tangential aligning contact with the toe portion of said last for deflecting the toe portion of said insole into substantial alignment therewith, and means for moving said heel and toe guide assemblies between said positions whereby the same mutually cooperate to obtain final tangential aligning contact between each of said assemblies and the toe and heel portions of said insole and last.

31. In the manufacture of footwear, apparatus of the type defined in claim 30 wherein said heel and toe guide assemblies each include a pair of contacting members which are mounted to universally move into tangential contact with an adjacent portion of said insole and last.

32. In the manufacture of footwear, apparatus of the type defined in claim 31, wherein each of said contacting members include a planar contacting face for establishing tangential contact with said insole and last.

33. In the manufacture of footwear, apparatus of the type defined in claim 31, wherein each of said contacting members include an annular contacting face for establishing tangential contact with said insole and last.

34. In the manufacture of footwear, apparatus of the type defined in claim 31 wherein each of said contacting members arrange to engage the toe portion of said insole and last includes a resilient contacting face portion for longitudinally displacing said insole relative to said last.

35. In the manufacture of footwear, apparatus of the type defined in claim 34, additionally including combining means for exerting an external pressure longitudinally across the upper surface of said insole after the latter has been moved to aligned superimposed position on said last.

36. In the manufacture of footwear, apparatus of the type defined in claim 35, wherein said combining means includes a reciprocating roller assembly mounted to move between a remote position and a combining position in contact with the upper surface of said insole.

37. In the manufacture of footwear, apparatus of the type defined in claim 36, additionally including means associated with said roller assembly for deflecting the toe portion of said insole against the toe portion of said last.

38. In the manufacture of footwear, apparatus of the type defined in claim 35, additionally including control means for confining the longitudinal movement of said combining means in relation to the longitudinal extent of said last.

39. In the manufacture of footwear, apparatus of the type defined in claim 35, additionally including means for initially positioning said combining means relative to the toe portion of said last in response to the size of said last.

40. In the manufacture of footwear, apparatus of the type defined in claim 30, additionally including means for elevating said supporting means in response to the size of said last for positioning the bottom portion thereof in predetermined cooperative relation relative to said aligning means.

41. In the manufacture of footwear, apparatus of the type defined in claim 11 wherein said cutting means additionally includes actuating means for selectively severing said tape in direct relation to the extent of said area.

42. An applicator for double-faced pressure-sensitive adhesive material in the form of a roll of tape containing a removable liner comprising an applicator roller for transferring said tape to a surface, stripping means for removing said liner from said tape, sensing means for detecting the angular displacement of said liner relative to the peripheral surface of said roll during removal of tape therefrom in order to actuate said stripping means in response to the amount of tape being transferred by said roller, and means for severing said tape.

43. An applicator of the type defined in claim 42 additionally including actuating means for selectively severing said tape in direct relation to the extent of said surface to be taped.

44. An applicator as defined in claim 42 wherein the applying face of said applicator roll includes a relatively non-adherent material for exerting pressure against said tape without effecting an adhesive bond therewith and a relatively adherent material for retaining said tape in adherent contact with said face.

45. An applicator of the type defined in claim 44 wherein the area of said relative non-adhesive material exceeds that of said adherent material.

46. An applicator of the type defined in claim 45 wherein said applicator roll includes a non-adherent cylindrical member and an adherent cylindrical member which cooperate to provide a pressure applying face for transferring said tape to the surface to be taped.

References Cited in the file of this patent

UNITED STATES PATENTS

| Re. 25,056 | Fritginger | Oct. 17, 1961 |
|---|---|---|
| 267,076 | Hall | Nov. 7, 1882 |
| 382,631 | Avery | May 8, 1888 |
| 1,365,221 | Blake | Jan. 11, 1921 |
| 1,858,584 | Furber | May 17, 1932 |
| 2,047,185 | Ballard et al. | July 14, 1936 |
| 2,236,531 | Finn | Apr. 1, 1941 |
| 2,384,003 | Bazzoni | Sept. 4, 1945 |
| 2,443,877 | Vacin | June 22, 1948 |
| 2,480,704 | Breth | Aug. 30, 1949 |
| 2,608,701 | Quinn | Sept. 2, 1952 |
| 2,652,166 | Johnson | Sept. 15, 1953 |
| 2,728,094 | James | Dec. 27, 1955 |
| 2,735,117 | Courchene et al. | Feb. 21, 1956 |
| 2,984,847 | Maeser | May 23, 1961 |
| 3,052,904 | Reid et al. | Sept. 11, 1962 |
| 3,076,210 | Brotchie et al. | Feb. 5, 1963 |

UNITED STATES PATENT OFFICE
CERTIFICATE OF CORRECTION

Patent No. 3,107,376                        October 22, 1963

John B. Reid et al.

It is hereby certified that error appears in the above numbered patent requiring correction and that the said Letters Patent should read as corrected below.

Column 1, line 32, for "stanied" read -- stained --; column 6, line 42, for "of" read -- to --; column 11, line 29, for "ling" read -- link --; column 31, line 66, and column 32, line 9, for "In the manufacture of footwear, an", each occurrence read -- An --; column 32, line 59, for "guid eassemblies" read -- guide assemblies --; column 33, line 68, for the claim reference numeral "34" read -- 30 --.

Signed and sealed this 14th day of April 1964.

(SEAL)
Attest:
ERNEST W. SWIDER

Attesting Officer

EDWARD J. BRENNER

Commissioner of Patents